(12) United States Patent
Silverstein et al.

(10) Patent No.: US 6,877,859 B2
(45) Date of Patent: Apr. 12, 2005

(54) PROJECTION APPARATUS USING TELECENTRIC OPTICS

(75) Inventors: Barry D. Silverstein, Rochester, NY (US); Heidi L. Hall, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/812,519

(22) Filed: Mar. 30, 2004

(65) Prior Publication Data

US 2004/0184007 A1 Sep. 23, 2004

Related U.S. Application Data

(63) Continuation-in-part of application No. 10/392,685, filed on Mar. 20, 2003, now Pat. No. 6,758,565.

(51) Int. Cl.[7] .............................................. G03B 21/14
(52) U.S. Cl. ........................................................ 353/20
(58) Field of Search ................................ 353/20; 349/9, 349/96; 359/500

(56) References Cited

U.S. PATENT DOCUMENTS

| | | | |
|---|---|---|---|
| 3,202,039 A | 8/1965 | DeLang et al. | 348/265 |
| 4,425,028 A | 1/1984 | Gagnon et al. | 359/246 |
| 4,441,791 A | 4/1984 | Hornbeck | 359/295 |
| 4,749,259 A | 6/1988 | Ledebuhr | |
| 4,836,649 A | 6/1989 | Ledebuhr et al. | 349/8 |
| 4,911,547 A | 3/1990 | Ledebuhr | |
| 5,098,183 A | 3/1992 | Sonehara | |
| 5,132,826 A | 7/1992 | Johnson et al. | 349/18 |
| 5,218,481 A | 6/1993 | McBeath et al. | 359/802 |
| 5,243,455 A | 9/1993 | Johnson et al. | 349/18 |
| 5,345,262 A | 9/1994 | Yee et al. | |
| 5,357,289 A | 10/1994 | Konno et al. | |
| 5,374,968 A | 12/1994 | Haven et al. | |
| 5,442,413 A | 8/1995 | Tejima et al. | 353/69 |
| 5,535,047 A | 7/1996 | Hornbeck | |
| 5,597,222 A | 1/1997 | Doany et al. | |
| 5,600,383 A | 2/1997 | Hornbeck | |
| 5,619,381 A | 4/1997 | Anderson | 359/677 |
| 5,621,486 A | 4/1997 | Doany et al. | |
| 5,658,490 A | 8/1997 | Sharp et al. | 252/299.01 |
| 5,719,695 A | 2/1998 | Heimbuch | |
| 5,798,819 A | 8/1998 | Hattori et al. | |
| 5,808,795 A | 9/1998 | Shimomura et al. | |

(Continued)

Primary Examiner—Christopher Mahoney
(74) Attorney, Agent, or Firm—Nelson Adrian Blish

(57) ABSTRACT

A digital projection apparatus (10) for projection of a multicolor image. A light source (20) provides visible light and a dichroic separator (27) splits the visible light into color light beams. Illumination optics directs each of the color light beams into a corresponding light modulation assembly (38). A magnifying relay lens (28) for each color light beam focuses and relays the modulated light to form a magnified real image of the reflective spatial light modulator (30). A dichroic combiner (26) forms a multicolor image by overlapping the magnified real images corresponding to each of the color light beams on a common optical axis. A projection lens projects the multicolor image toward a display surface. The polarization analyzers (72) are tilted relative to a local optical axis and are located in proximity to at least one of the magnified real images of the color light beams.

15 Claims, 14 Drawing Sheets

U.S. PATENT DOCUMENTS

| | | | |
|---|---|---|---|
| 5,838,415 A | * 11/1998 | Hayashi et al. | 349/8 |
| 5,886,835 A | 3/1999 | Suzuki et al. | 359/782 |
| 5,907,437 A | 5/1999 | Sprotbery et al. | |
| 5,914,818 A | 6/1999 | Tejada et al. | |
| 5,918,961 A | 7/1999 | Ueda | |
| 5,930,050 A | 7/1999 | Dewald | |
| 5,944,401 A | 8/1999 | Murakami et al. | 353/33 |
| 5,962,114 A | 10/1999 | Jonza et al. | 428/212 |
| 5,978,136 A | 11/1999 | Ogawa et al. | 359/487 |
| 6,008,951 A | 12/1999 | Anderson | |
| 6,010,221 A | 1/2000 | Maki et al. | 353/33 |
| 6,019,474 A | 2/2000 | Doany et al. | 353/33 |
| 6,053,615 A | 4/2000 | Peterson et al. | 353/20 |
| 6,062,694 A | 5/2000 | Oikawa et al. | 353/20 |
| 6,089,717 A | 7/2000 | Iwai | 353/31 |
| 6,113,239 A | 9/2000 | Sampsell et al. | 353/20 |
| 6,122,103 A | 9/2000 | Perkins et al. | 359/486 |
| 6,172,813 B1 | 1/2001 | Tadic-Galeb et al. | |
| 6,185,041 B1 | 2/2001 | Tadic-Galeb et al. | 359/618 |
| 6,220,713 B1 | 4/2001 | Tadic-Galeb et al. | 353/77 |
| 6,239,917 B1 | 5/2001 | Tadic-Galeb et al. | 359/663 |
| 6,243,199 B1 | 6/2001 | Hansen et al. | |
| 6,247,816 B1 | 6/2001 | Cipolla et al. | |
| 6,254,237 B1 | 7/2001 | Booth | |
| 6,262,851 B1 | 7/2001 | Marshall | |
| 6,280,035 B1 | 8/2001 | Tadic-Galeb et al. | |
| 6,321,192 B1 | 11/2001 | Houchin et al. | 704/9 |
| 6,417,892 B1 | 7/2002 | Sharp et al. | 348/742 |
| 6,511,183 B1 * | 1/2003 | Shimizu et al. | 353/20 |
| 6,532,111 B1 | 3/2003 | Kurtz et al. | 359/486 |
| 6,547,398 B1 * | 4/2003 | Cho et al. | 353/31 |
| 6,676,260 B1 * | 1/2004 | Cobb et al. | 353/31 |
| 2003/0025880 A1 * | 2/2003 | Newell et al. | 353/20 |
| 2003/0071973 A1 * | 4/2003 | Hansen et al. | 353/20 |

* cited by examiner

PROJECTION APPARATUS USING TELECENTRIC OPTICS

CROSS REFERENCE TO RELATED APPLICATIONS

This is a continuation-in-part of Ser. No. 10/392,685, filed Mar. 20, 2003, now U.S. Pat. No. 6,758,565 entitled PROJECTION APPARATUS USING TELECENTRIC OPTICS, by Cobb et al.

FIELD OF THE INVENTION

This invention generally relates to a projection apparatus that forms a color image from digital data using a spatial light modulator and more particularly relates to a projection apparatus that maintains a telecentric optical path for both source illumination and modulated light.

BACKGROUND OF THE INVENTION

In order to be considered as suitable replacements for conventional film projectors, digital projection systems must meet demanding requirements for image quality. This is particularly true for multicolor cinematic projection systems. In order to provide a competitive alternative to conventional cinematic-quality projectors, digital projection apparatus must meet high standards of performance, providing high resolution, wide color gamut, high brightness, and frame-sequential contrast ratios exceeding 1,000:1.

The most promising solutions for multicolor digital cinema projection employ, as image forming devices, one of two basic types of spatial light modulators. The first type of spatial light modulator is a Digital Micromirror Device (DMD), developed by Texas Instruments, Inc., Dallas, Tex. DMD devices are described in a number of patents, for example U.S. Pat. Nos. 4,441,791; 5,535,047; 5,600,383 (all to Hornbeck); and U.S. Pat. No. 5,719,695 (Heimbuch). Optical designs for projection apparatus employing DMDs are disclosed in U.S. Pat. No. 5,914,818 (Tejada et al.); U.S. Pat. No. 5,930,050 (Dewald); U.S. Pat. No. 6,008,951 (Anderson); and U.S. Pat. No. 6,089,717 (Iwai). DMDs have been employed in digital projection systems. However, although DMD-based projectors demonstrate some capability to provide the necessary light throughput, contrast ratio, and color gamut, inherent resolution limitations (with current devices providing only 1024×768 pixels) and high component and system costs have restricted DMD acceptability for high-quality digital cinema projection.

The second type of spatial light modulator used for digital projection is a Liquid Crystal Device (LCD). The LCD forms an image as an array of pixels by selectively modulating the polarization state of incident light for each corresponding pixel. LCDs appear to have advantages as spatial light modulators for high-quality digital cinema projection systems. These advantages include relatively large device size and favorable device yields. Among examples of electronic projection apparatus that utilize LCD spatial light modulators are those disclosed in U.S. Pat. No. 5,808,795 (Shimomura et al.); U.S. Pat. No. 5,798,819 (Hattori et al.); U.S. Pat. No. 5,918,961 (Ueda); U.S. Pat. No. 6,010,221 (Maki et al.); and U.S. Pat. No. 6,062,694 (Oikawa et al.). Exemplary LCD projection patents U.S. Pat. No. 4,425,028 (Gagnon); U.S. Pat. No. 4,749,259 (Ledebuhr); and U.S. Pat. No. 4,911,547 (Ledebuhr) describe dual color polarization designs that provide improved color performance.

In an electronic projection apparatus using spatial light modulators, individual colors, conventionally red, green, and blue (RGB), are separately modulated in a corresponding red, green, or blue portion of the optical path. The modulated light of each color is then combined in order to form a composite, multicolor RGB color image. There are two basic approaches for projection optics that combine the modulated color light. The first approach, which can be characterized as a convergent approach, is adapted from earlier, conventional projection systems. Using the convergent approach, the component red, green, and blue light have separate axes which are converged by projection optics that effectively bend each light path as necessary in order to form a composite, multicolor color image at some focal plane. As an illustrative example, U.S. Pat. No. 5,345,262 (Yee et al.) discloses a convergent video projection system. Significantly, the disclosure of U.S. Pat. No. 5,345,262 illustrates one of the major problems with the convergent projection approach: namely, that the separate color images must be properly registered on the projection surface. Misregistration or poor focus along any one of the color light projection paths can easily result in an unsatisfactory image. It is instructive to observe that, using this approach, the image paths are converged only at the focus plane.

U.S. Pat. No. 5,907,437 (Sprotbery et al.) discloses an attempt to simplify design complexity and alleviate some of the light path alignment and registration problems inherent to multicolor projection systems using the convergent approach described above. In the U.S. Pat. No. 5,907,437 disclosure, a light valve projection system is described in which a converging optical system converges the red, green, and blue modulated light paths in order to form a converged image, advantageously centered on the axis of a projection lens. The design strategy outlined in U.S. Pat. No. 5,907,437 thus simplifies the projection lens design task for a system using the convergent approach. However, other problems inherent to a convergent approach remain.

One notable problem with approaches similar to that disclosed in U.S. Pat. No. 5,907,437 is a relatively high etendue. As is well known in the optical arts, etendue relates to the amount of light that can be handled by an optical system. Potentially, the larger the etendue, the brighter the image. Numerically, etendue is proportional to the product of two factors, namely the image area and the square of the numerical aperture (NA). Increasing the numerical aperture, for example, increases etendue so that the optical system captures more light. Similarly, increasing the source image size, so that light originates over a larger area, increases etendue and, therefore, brightness. As a general rule, increased etendue results in a more complex and costly optical design. Using an approach such as that outlined in U.S. Pat. No. 5,907,437, for example, lens components in the optical system must be designed for large etendue. The source image area for the light that must be converged through system optics is the sum of the combined areas of the spatial light modulators in red, green, and blue light paths; notably, this is three times the area of the final multicolor image formed. That is, for the configuration disclosed in U.S. Pat. No. 5,907,437, optical components handle a sizable image area, therefore a high etendue, since red, green, and blue color paths are separate and must be optically converged. Moreover, although the configuration disclosed in U.S. Pat. No. 5,907,437 handles light from three times the area of the final multicolor image formed, this configuration does not afford any benefit of increased brightness, since each color path contains only one-third of the total light level. In particular, the second relay lens and the projection lens of a convergent optics system such as that disclosed in U.S. Pat. No. 5,907,437 are inherently constrained by a large etendue, which adds cost and complexity to such a solution. Moreover, the second relay lens must be color corrected over the full visible spectrum. At the same time, different segments of the relay lens and of the projection lens handle different wavelengths, so that localized lens imperfections, dust, or dirt not only affect the projected image, but can impact the color quality. In light, then, of etendue constraints, of color correction requirements, of dust and dirt sensitivity, and of the need for maximizing brightness levels for digital projection, there appear to be significant inherent limitations that hamper the convergent approach exemplified in U.S. Pat. No. 5,907,437.

An alternative approach to projection optics can be characterized as a coaxial approach. In contrast to the convergent approach in which component red, green and blue light beams are bent to converge at a focal plane, the coaxial approach combines the component red, green, and blue modulated light beams along a common axis. In order to do this, the coaxial approach employs a dichroic combining element, such as an X-cube or Philips prism. X-cubes or X-prisms and related dichroic optical elements, such as those disclosed in U.S. Pat. No. 5,098,183 (Sonehara) and U.S. Pat. No. 6,019,474 (Doany et al.) are well known in the optical imaging arts. The dichroic combining element combines modulated light from each color path and folds the color paths together along a common axis in order to provide the combined color image to a projection lens. Referring to FIG. 1, there is shown a simplified block diagram of a conventional digital projection apparatus 10 using the coaxial approach. Each color path (r=Red, g=Green, b=Blue) uses similar components for forming a modulated light beam. Individual components within each path are labeled with an appended r, g, or b, appropriately. For the description that follows, however, distinctions between color paths are specified only when necessary. Following any of the three color paths, a light source 20 provides unmodulated light, which is conditioned by uniformizing optics 22 to provide a uniform illumination. A polarizing beamsplitter 24 directs light having the appropriate polarization state to a spatial light modulator 30 which selectively modulates the polarization state of the incident light over an array of pixel sites. The action of spatial light modulator 30 forms an image. The modulated light from this image, transmitted along an optical axis $O_r$, $O_g$, $O_b$ through polarizing beamsplitter 24, is directed to a dichroic combiner 26, typically an X-cube, Philips prism, or combination of dichroic surfaces in conventional systems. Dichroic combiner 26 combines the red, green, and blue modulated images from separate optical axes $O_r$, $O_g$, $O_b$ to form a combined, multicolor image for a projection lens 32 along a common optical axis O for projection onto a display surface 40, such as a projection screen.

In contrast to the convergent approach outlined above with reference to U.S. Pat. No. 5,907,437, the coaxial approach, as shown in the block diagram of FIG. 1 and as exemplified in U.S. Pat. No. 5,808,795 has a number of advantages. With respect to light throughput, the coaxial approach, because it combines light paths along a common axis, does not increase the etendue of the optical system. Instead, with respect to projection lens 32, dichroic combiner 26, by folding the appropriate optical axes $O_r$ and $O_b$ to join with optical axis $O_g$ and form a common optical axis O, optically overlaps the areas of spatial light modulators 30r, 30g, 30b. Thus, the etendue has no increase whether one, two, three, or more spatial light modulators are combined in this way. Since each light color is separately modulated, then combined and provided to projection lens 32 along a common optical axis O, no optical system is required between dichroic combiner 26 and projection lens 32.

A Philips prism, such as that disclosed in U.S. Pat. No. 3,202,039 (DeLang et al.) could alternately be employed as dichroic combiner 26. Familiar to those skilled in the digital image projection arts, Philips prisms have been employed as chromatic separator or combiner components in projector designs such as those disclosed in U.S. Pat. Nos. 6,280,035 and 6,172,813 (both to Tadic-Galeb et al.); U.S. Pat. No. 6,262,851 (Marshall); and U.S. Pat. No. 5,621,486 (Doany et al.), for example.

While digital projection apparatus 10 designed using the basic model of FIG. 1 are able to provide good levels of image quality, there is felt to be room for improvement. Constraints imposed by dichroic coatings are a key consideration. Dichroic coatings used for dichroic combiner 26 can be expensive and difficult to design and fabricate for suitable performance with incident light over a wide range of angles, particularly in projection applications where high brightness levels and a broad color gamut are needed. Dichroic coatings reflect and transmit light as a function of incident angle and wavelength. As the incident angle varies, the wavelength of light that is transmitted or reflected also changes. Where a dichroic coating is used with an optical system having a low f/#, a broad spectrum will be reflected or transmitted by the coating, due to the wide range of incident angles.

FIGS. 2a and 2b illustrate the change in the performance of a dichroic coating as the range of incident light angles increases. Referring to FIGS. 2a and 2b, there is represented a light cone from a point source P and incident to a dichroic surface 36, which is disposed at a diagonal in these Figures. FIGS. 2a and 2b represent light incident to a dichroic surface 36 at two different f/# values. In FIG. 2a, the light cone, having a smaller f/#, is incident to dichroic surface 36 at a larger range of angles. Incident angles are considered with respect to a normal N to dichroic surface 36. Because of the difference between angle A at one extreme of the incident light beam and angle B at the opposite extreme, dichroic surface 36 will cause a color shift to occur across the transmitted and reflected light cones.

By comparison, the light cone is incident at a larger f/# in FIG. 2b. Here, there is very little difference between angles A' and B' at extreme edges of the incident light cone. In such a case, dichroic surface 36 response will cause correspondingly less color shift across the transmitted and reflected light cones than with the smaller f/# shown in FIG. 2a.

As is clear from FIGS. 2a and 2b, dichroic surface 36 has some support structure, typically a prism 42. For minimizing aberrations, the flatness of surfaces 44a and 44b is of more importance with the smaller f/# of FIG. 2a where the light cone presents a wider angular range, than with the larger f/# of FIG. 2b where the light cone presents a smaller angular range. Thus, if a larger f/# light cone can be used, surface tolerance requirements of prism 42 in a dichroic combiner can be relaxed, thereby reducing cost and alignment complexity. However, conventionally, a light cone having a smaller f/# is used in projection systems, since system designs are directed to maximizing brightness.

Related to the benefits of higher f/# illustrated in FIGS. 2a and 2b are the benefits of telecentricity illustrated by comparing FIGS. 2c and 2d. Here, point sources P1, P2, and P3 represent points on a flat image plane, with rays incident on dichroic surface 36. In FIG. 2c, light cones from point sources P1, P2, and P3 are telecentric and corresponding angles C and D are identical. By comparison, in FIG. 2d, the light cones are not telecentric and corresponding angles C' and D' differ. This difference in incident angles can cause light from point source P1 to have a slightly different color than light from point source P3, thereby producing a color shift over the field.

It may be observed that FIGS. 2a–2d, as drawn, do not show the refraction of light at the glass-air interface. As is well known, some refraction would occur, modifying the angles of incident light to some degree.

From FIGS. 2a–2d, it can be seen that there are advantages in providing telecentric light at a small range of incidence angles (that is, at high f/#). However, in practice, it has been shown to be difficult to obtain these advantages for digital projection apparatus, due to the need to maintain high brightness levels at the same time.

As is well known in the imaging arts, in order to maximize color gamut, each composite color should have a narrow spectral range, to provide as pure a saturated color as possible. For example, it would be difficult to produce a deep red color using a red light channel that also includes some green light. Thus, where a low f/# is used with a color-combining prism or other optical element, the broad spectral response of the dichroic coating reduces the color gamut. At the same time, however, a low f/#, because it collects more light at a wider angular range, is desirable for obtaining high brightness levels. While there are conventional corrective techniques for improving color gamut, such as filtering, these techniques can reduce brightness. The limitations of coatings within dichroic combiner 26, then, constrain the capability of projection apparatus 10 optics to optimize both brightness level and color gamut.

FIG. 3a illustrates the response of an idealized X-cube 126 to light directed through a lens 132 from a light source P. X-cube 126 comprises four prisms 128a, 128b, 128c, and 128d, having appropriate surface treatments and cemented together. Surfaces 130a and 130b are treated to reflect light from P having the proper wavelength. Surfaces 130a and 130b must be perfectly planar and perfectly aligned with respect to one another to provide aberration-free reflection in order to form an image at point P'. In contrast with FIG. 3a, FIG. 3b shows the response of X-cube 126' in which surfaces 130a and 130b are not perfectly aligned. The misalignment of surfaces 130a and 130b causes light from point source P to form two separate images at points P1' and P2'. Aberration effects, such as the visible seam noted above, would be most noticeable when the distance between image points P1' and P2' is on the order of one pixel width or larger. Clearly, blur in an image that is reflected through X-cube 126' would be increasingly more pronounced with increasing distance, in any direction, between image points P1' and P2'. Correspondingly, the smaller the pixel dimensions, the greater the impact of an aberration due to imperfections in fabrication of X-cube 126'.

Limitations of the familiar X-cube dichroic combiner 26 are inherent in the manufacture of the device itself. The X-cube is assembled from four prisms, with the internal surfaces of each prism serving as substrates which support the appropriate dichroic coatings. In fabrication, prisms are glued together, with inner surface planes aligned as closely as possible. However, even slight tolerance errors in X-cube fabrication can result in imaging problems when these devices are used with conventional digital projection solutions. For example, slight misalignment of the planar coated surfaces within the X-cube could cause aberrations such as color fringing. Color fringing aberrations can be corrected up to a point, however, there would be advantages to a dichroic combiner design that was less prone to problems of this type. The "seam" at which dichroic surfaces are combined tends to appear as one or more linear shadow artifacts in the displayed image. Fabrication of a high-quality X-cube is further complicated by the requirement that individual component prisms have identical refractive indices; in practice, this is best accomplished when the same glass melt is used for all prism components. In addition, coating processes must be uniform on multiple prism surfaces. Optical coatings applied to X-cube surfaces typically have sub-micron thickness and are multi-layered, sometimes requiring as many as 50 or 60 layers. Thus, careful parts tracking must be carried out in addition to precision fabrication practices. Further problems are a result of the difficulties in providing uniform, flat surfaces on outer faces of the assembled X-cube. It can be well appreciated that this complexity adds considerable cost to the X-cube. Finally, obtaining brightness using conventional approaches results in high heat levels, which can damage adhesives and coating surfaces of the X-cube.

It can be readily appreciated that, in practice, fabrication of a perfect X-cube 126 as in FIG. 3a would be very difficult and some tolerance for error must be allowed. For this reason, it is advantageous, when designing an optical system using an X-cube 126, to minimize dependence on maintaining precise X-cube 126 tolerances.

Of related importance for imaging quality is preserving telecentricity wherever possible in the optical system. As was described above, particularly with reference to FIGS. 2a–2d, it is beneficial to minimize angular differences for light incident at any dichroic surface in the optical system, both for color-separating and for color-combining dichroics. In addition, it is also well known in the optical design arts that telecentric imaging at spatial light modulator 30 helps to further reduce contrast shading across the image. When cones of light from two different point source locations on the surface of spatial light modulator 30 are not telecentric, these different locations then present different incident angles to dichroic surfaces in dichroic combiner 26. In response, dichroic combiner 26 reflects different wavelength bands at different field positions, resulting in color shifts across the image.

As another well known principle in design of projection apparatus, it is beneficial to minimize the retrofocus distance of projection lens 32, thus minimizing the back working distance requirements and cost of projection lens 32. It would be preferable to avoid the cost and complexity requirements of a projection lens having a long back focal length relative to its effective focal length, such as the solution disclosed in U.S. Pat. No. 6,008,951 (Anderson), for example.

U.S. Pat. No. 6,113,239 (Sampsell et al.) discloses an arrangement of projection display components with a hybrid X-cube design that incrementally reduces the back working distance requirement for a projection lens. In this disclosure, both polarizing beamsplitters and dichroic combining surfaces are combined in a single X-cube, shortening the projection lens working distance when compared with other prior art designs. Notably, however, improved brightness is not achieved by the design in U.S. Pat. No. 6,113,239, since the angular constraints of dichroic surfaces have not been alleviated. Other problems include costly coatings solutions, since polarizing beamsplitter coatings are not readily optimized for all color and polarization combinations. Moreover, further improvement in the working distance requirements would be beneficial.

U.S. Pat. No. 5,944,401 (Murakami et al.) discloses, as an alternative to X-cube dichroics, an optical block comprising dichroic surfaces within plastic prisms. This solution provides some relief for back working distance requirements, since the refractive index of plastics exceeds that of air. To minimize back working distance, transmissive spatial light modulators are employed, allowing image-formation as close to the combining optical block as possible. However, this arrangement would not be well-suited for projector apparatus using reflective spatial light modulators, since back working distance requirements are still excessive. In terms of back working distance, the solution of U.S. Pat. No. 5,944,401 is not advantaged over conventional X-cube designs. A sizable projection lens would be required for full-scale cinema projection.

Moreover, the solution disclosed in U.S. Pat. No. 5,944,401 does not address the inherent angular limitations of dichroic surfaces described above. Thus, brightness levels are constrained with this type of design solution.

U.S. Pat. No. 5,597,222 (Doany et al.) discloses, for use in a digital projector, an optical relay lens system that alleviates some of the difficulties noted above that relate to inherent tolerance problems and projection lens working requirements. U.S. Pat. No. 5,597,222 discloses the use of a single 1×, double-telecentric relay lens to relay the combined image from individual RGB color paths to a MacNeille polarizing beamsplitter (PBS), also termed a polarization beamsplitter. In U.S. Pat. No. 5,597,222 spatial light modulators are disposed very near a dichroic combiner X-cube, to minimize thereby some of the potential adverse effects of imperfections in outer surface flatness and tolerance errors in inner surface fabrication. The system disclosed in U.S. Pat. No. 5,597,222 is advantaged in that the design of its projection lens is simplified when compared with similar designs. The working distance requirements for the projection lens are significantly reduced using the design approach of U.S. Pat. No. 5,597,222. The single 1× double telecentric relay provides the necessary working distance to allow insertion of the MacNeille PBS prior to the intermediate internal combined image in the image path. The projection lens can then re-image this internal image to the screen without the requirements for long working distance that are typically required when using a PBS and/or a dichroic color combiner, such as an X-prism. However, the solution presented in U.S. Pat. No. 5,597,222 falls far short of what is needed to compensate for inherent problems with X-cube coatings and surfaces so that both image brightness and color gamut can be maintained. For example, the design noted in U.S. Pat. No. 5,597,222 fails to address inherent angular dependencies in the dichroic coating response, so that it remains difficult to support a large color gamut while maintaining image brightness at the same time. Moreover, the projection lens must also use a high numerical aperture with this design, which implies added cost over designs with lower numerical aperture. Because of the scale of spatial light modulator components, the design of U.S. Pat. No. 5,597,222 is still very dependent on high-quality X-cube design. Further, the arrangement disclosed in U.S. Pat. No. 5,597,222 employs a relatively large number of optical components between a polarizing beamsplitter and its modulating LCD. With a large number of optical components in the path of a polarized illumination source, some unavoidable stress birefringence would necessarily alter the polarization states of both unmodulated and modulated light traveling in both directions, resulting in loss of image contrast.

U.S. Pat. No. 5,357,289 (Konno et al.) discloses a system that, similar to that disclosed U.S. Pat. No. 5,597,222 uses a single 1× relay lens to present an internal intermediate image to the projection lens, thereby significantly reducing the working distance requirements imposed on projection lens design. U.S. Pat. No. 5,357,289 provides an alternate construction to that shown in U.S. Pat. No. 5,597,222 for using polarization and color combining prisms. In the apparatus of U.S. Pat. No. 5,357,289, both the polarizing and color-combining prism are in the vicinity of the spatial light modulators, rather than spaced well apart, as in the apparatus of U.S. Pat. No. 5,597,222. Instead of the conventional X-prism, the apparatus of U.S. Pat. No. 5,357,289 uses a V-prism as a color combiner, where the V-prism is similar to that disclosed in U.S. Pat. No. 5,944,401 described above. The V-prism approach avoids some of the inherent problems with X-cube fabrication and use. While the approach disclosed in U.S. Pat. No. 5,357,289 eases the demands on projection lens design, the imaging relay (first lens group) presents a challenge, since it must provide a long working distance for the spatial light modulators and associated PBS and color-combining V-prism. As with the approach noted in U.S. Pat. No. 5,597,222, the approach shown in U.S. Pat. No. 5,357,289 uses a single imaging relay lens for all three colors (RGB), operating nominally at 1× magnification. As was seen with the U.S. Pat. No. 5,597,222 apparatus, the U.S. Pat. No. 5,357,289 approach requires a complex imaging relay lens that is fully color corrected over a broad part of the visible spectrum in order to form a white light image having minimal color aberrations or color differences in the third order aberrations, particularly with respect to distortion and defocus.

U.S. Pat. No. 6,247,816 (Cipolla et al.) discloses use of a 1×relay lens for relaying an intermediate image towards a dichroic combiner in only one of the color paths. The solution in U.S. Pat. No. 6,247,816 addresses a component packaging problem, but does not alleviate any of the angular constraints imposed by dichroic combiner response. Neither does the solution in U.S. Pat. No. 6,247,816 provide any relief with respect to back working distance requirements of the projection lens.

U.S. Pat. No. 4,836,649 (Ledebuhr et al.) discloses a 1× relay lens arrangement used in the illumination path to minimize the size of polarization components and in the modulated light path to help alleviate back working distance constraints for a digital projection system. While this arrangement provides some advantages, color-combining dichroic surfaces must still handle light at low f/# values, resulting in reduced color gamut. Moreover, the projection lens must also operate at a low f/# when using this solution.

As is stressed in the disclosure of U.S. Pat. No. 5,374,968 (Haven et al.) the conventional approach for maximizing brightness in projection systems emphasizes low f/# optics. However, as is noted above with reference to FIGS. 2a–2d, the performance of dichroic surfaces used for combining color image paths is hindered by the large incidence angles of low f/# optical systems.

In spite of their high cost and known problems, X-cubes have served as dichroic combiners in a substantial number of imaging device designs. One reason for the widespread use of X-cubes and similar devices relates to their compact size when compared against other solutions using dichroic surfaces. In order to minimize back working distance of the projection lens, conventional design approaches position spatial light modulators closely to the X-cube, as was shown in U.S. Pat. No. 6,113,239, for example.

Strategies for eliminating the X-cube include those disclosed in U.S. Pat. No. 6,321,192 (Konno et al.) Here, dichroic mirrors are employed for combining the light from each color modulation path, with equal optical distances maintained in each light path. The system described provides a less costly solution than conventional solutions using X-cube optics. At the same time, however, the solution disclosed in U.S. Pat. No. 6,231,192 does not alleviate the back working requirements of the projection lens system. This solution limits the f/# of projector optics to slower speeds, constraining the available brightness and requiring larger projection lens diameters. Correction for astigmatism must be provided by cylindrical optics in the projection path.

Dichroic components, including X-cubes, Philips prisms, and related structures that use dichroic surfaces, are also used in the illumination light path, conventionally employed to separate white light into red, green, and blue light components for modulation. U.S. Pat. No. 6,053,615 (Peterson et al.), U.S. Pat. No. 6,220,713 (Tadic-Galeb et al.), and U.S. Pat. No. 6,254,237 (Booth) are just a few examples of projector designs using dichroic components for color separation. As can be expected, the same performance problems related to light incident angle apply whether dichroic coatings are used to combine modulated light into the projection path or are used to separate unmodulated light in the illumination path. When dichroic surfaces receive incident light at varying angles, output performance is affected, causing perceptible color shifts across the field. It is difficult to correct for this slight color shading; graduated filters are expensive to design and reduce the overall brightness available. With respect to color accuracy, optimum results are obtained when dichroic surfaces handle incident light at relatively low incident angles. This provides the best filter response characteristics, allowing minimal leakage of unwanted color in each color channel. Referring to FIG. 4, there is shown a typical reflectance response, by wavelength, for a dichroic surface. The set of curves show the successive variation in response for the same dichroic surface as the incident angle changes over a range. At the extremes of this range of incident angles, curves 150*a* and 150*z* show how dramatically this response can be altered. Here, the response curve changes its reflectance characteristics with incident angle, so that with the incident angle at one extreme the primary transition occurs near 520 nm, as shown by curve 150*a*, and at the other extreme the primary transition occurs just above 620 nm, as shown by curve 150*z*. Since incident light will vary over some range, there can easily be some leakage of green light into the red channel, for example. Thus, it can be appreciated that limiting the range of incident angles handled by a dichroic surface will provide the best color performance. It is also instructive to compare the steeper slope of curve 150*a* with the less steep slope of curve 150*z*. As a general rule, the steeper the slope of the response curve for a dichroic surface, the better the spectral characteristics, that is, the less leakage of unwanted wavelengths. Sharply defined spectral edges are desirable for obtaining the best color response from a dichroic surface.

One solution for maximizing brightness and reducing the overall incident angles at color combiner dichroic surfaces is to increase the size of the uniform light area and effectively lower the numerical aperture of the uniformized light area that is incident on dichroic separator surfaces. However, this would be difficult to achieve without increasing the bulk and cost of uniformizing components. Further problems present themselves. For example, where an integrating bar is used as a light uniformizer, it would not be sufficient merely to make the integrating bar larger in cross-section. In order for sufficient homogenizing of the light, the integrating bar would also need to be longer, adding size, weight, and cost. Similar problems limit solutions using other types of uniformizing components. Such solutions are made more difficult by the need to maximize light at the spatial light modulator itself, providing incident light at a high numerical aperture.

In summary, conventional approaches to digital projector design make some compromises relative to performance, cost, and complexity in order to provide a high quality image with maximum brightness. Existing designs admit some degree of color shift; conventional approaches for correcting color shift would require more costly dichroic coatings and entail some additional loss of brightness in both illumination and modulation optics paths. Thus, it can be seen that there is a need for improvement in illumination and modulation path optics for digital projection that alleviates the inherent angular limitations of lower cost dichroic coatings while providing maximum brightness and color gamut.

SUMMARY OF THE INVENTION

Briefly, according to one aspect of the present invention, a digital projection apparatus for projection of a multicolor image. A light source provides visible light and a dichroic separator splits the visible light into color light beams. Illumination optics directs each of the color light beams into a corresponding light modulation assembly. A magnifying relay lens for each color light beam focuses and relays the modulated light to form a magnified real image of the reflective spatial light modulator. A dichroic combiner forms a multicolor image by overlapping the magnified real images corresponding to each of the color light beams on a common optical axis. A projection lens projects the multicolor image toward a display surface. The polarization analyzers are tilted relative to a local optical axis and are located in proximity to at least one of the magnified real images of the color light beams.

It is a feature of the present invention that it provides a magnifying base condenser relay lens that is double-telecentric, to magnify the image of the uniform plane formed by the uniformizing means and provide this image as input illumination for a color separator. Each reducing relay lens is also double-telecentric, thereby maintaining the uniformity of illumination in the projection apparatus. Finally, the magnifying relay lens in each output color modulation path is also double-telecentric, thereby maintaining a highly telecentric light path within the optical system of the apparatus.

By magnifying the image of a uniform field, the magnifying base condenser relay lens effectively allows the dichroic separator to operate at a higher f/#, receiving a narrower range of incident angles, thus decreasing color shift across the angular field that is incident on the dichroic surface. This creates a more sharply defined spectral edge for each color channel and thus improves the efficiency of the illumination system.

It is an advantage of the present invention that, because it relays light to the dichroic separator at a lower f/#, it allows use of less expensive dichroic coatings on separator components.

It is a further advantage of the present invention that it favorably changes the numerical aperture at key points within the illumination system. At the uniformizing component itself, a high numerical aperture is best. By magnifying the image of the uniform area, the present invention then provides the image to the dichroic separator at a reduced numerical aperture, which is most favorable. Then, at the spatial light modulator itself, demagnification provides a higher numerical aperture, needed for obtaining the maximum brightness. Next, magnification of the modulated image provides the magnified image to dichroic surfaces on the dichroic combiner at a reduced numerical aperture, minimizing shading effects at this component and reducing the dependence of the imaging system on precision fabrication of X-cube optics.

It is an advantage of the present invention that it allows the use of a projection lens having a reduced numerical aperture and a short working distance. By thus relaxing requirements of the projection lens, the present invention provides cost savings over more demanding designs. In addition, the present invention allows a projector to be designed with interchangeable projection lenses, so that an appropriate projection lens can be easily and economically substituted for a particular display environment. Further, by reducing numerical aperture requirements of the projection lens, the present invention inherently reduces the complexity inherent in the design of anamorphic projection lens elements.

It is a further advantage of the present invention that it reduces the size and weight requirements for uniformizing components in the illumination path.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

The goal of the present invention is to provide illumination and modulation optics for a color projection system where brightness is maximized and color shading effects due to dichroic surface angular response are minimized.

Figure 5:
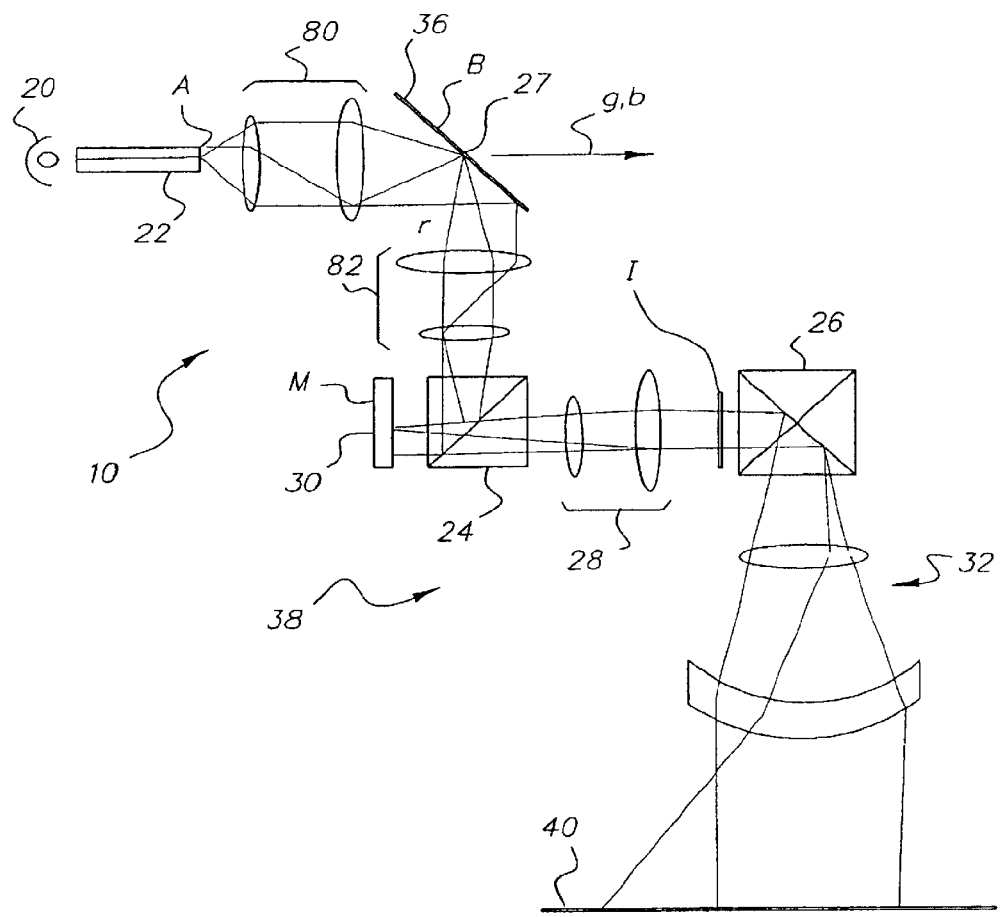
FIG. 5 is a schematic view showing key components in the illumination and one modulation path.

Referring to FIG. 5, there is shown, in schematic form, an implementation of components used in the red optical path of projection apparatus 10 in the present invention. A polychromatic light source 20 directs source illumination through uniformizing optics 22. Light source 20 is typically a lamp, such as a Xenon arc lamp, but could also be some other type of high-intensity light emitter. In a preferred embodiment, an integrating bar serves as uniformizing optics 22. Well-known in the optical design art, integrating bars, also termed light-mixing bars, use Total Internal Reflection (TIR) effects to homogenize incident light, thereby providing a spatially uniform plane of illumination. Other options for uniformizing optics 22 include a lenslet array, such as a fly's eye array, or a diffusing screen, an integrating tunnel, fiber optic faceplate, or glass. Uniformizing optics 22 provides a uniform plane of light at its output A. The definition or tolerance for illumination uniformity is relative, and typically a gradual fall-off in illumination intensity from center to edge of 10–15% is acceptable. A telecentric base condenser relay 80 (or first illumination optics) images this output at B, magnifying the image at output A and directing the light toward dichroic surface 36 in a dichroic separator 27. Referring again to FIG. 5, only the red light path is illustrated; the remaining blue and green light, transmitted through dichroic surface 36 illuminate separate modulation paths in a similar manner, using techniques well known in the color imaging arts. In this way, there is formed an enlarged internal image of output A for each red, green, and blue color path.

In a light modulation assembly 38, a reducing relay 82 (or second illumination optics) then demagnifies the colored light output at B from dichroic separator 27 and directs the light toward a spatial light modulator 30, effectively providing a color reduced internal image of output A at spatial light modulator 30. There is a separate reducing relay 82 in each color light path. In the preferred embodiment of FIG. 5, spatial light modulator 30 is a reflective LCD, requiring polarizing beamsplitter 24. Polarizing beamsplitter 24 could be a conventional MacNeille beamsplitter or a wire grid beamsplitter, such as those available from Moxtek Inc. of Orem, Utah or described in U.S. Pat. No. 6,243,199, for example. A magnifying relay lens 28 forms a magnified real image I of spatial light modulator 30 near or within dichroic combiner 26, an X-cube in a preferred embodiment. Magnifying relay lens 28 is double-telecentric, so that the modulated light beam directed toward dichroic combiner 26 is in telecentric form. Because dichroic combiner 26 handles telecentric light, there is minimal tendency for color shading across magnified real image I due to angular variances. Significantly, by magnifying the image formed on spatial light modulator 30 with some magnification factor greater than 1×, magnifying relay lens 28 also effectively focuses magnified real image I at a higher f/# than 1× relay operation would provide. As a result, dichroic combiner 26 handles a narrower spectral band along this color channel and is thereby able to provide a larger color gamut than would be achievable under a lower f/#. Moreover, with the use of magnifying relay lens 28, no light is lost even though a higher f/# is achieved at dichroic combiner 26, since a low f/# is still used at spatial light modulator 30. As a result, an improved magnified real image I is provided, as the output of dichroic combiner 26.

Taken as a whole, projection apparatus 10 can be considered as a system comprising a series of multiple intermediate images. In the illumination system, the output of uniformizing optics 22 at plane A is optically conjugate to dichroic separator 27 at plane B and is re-imaged as a white light image to plane B by base condenser relay 80 at a certain magnification, Nx, where N exceeds 1. As this light passes through plane B and encounters the surface of dichroic separator 27, the three component colors are separated. For each color beam, image plane B is conjugate to respective spatial light modulator 30 located at plane M and is re-imaged by reducing relay 82 at a magnification Sx where S is less than 1. Then, for each of the color beams, spatial light modulator 30 at plane M is, in turn, conjugate to magnified real image I and is re-imaged by magnifying relay lens 28 at a magnification Rx where R exceeds 1. In projection apparatus 10, the designs of reducing relays 82 and magnifying relays 28 in each color path are relatively straightforward. Because each reducing relay 82 and magnifying relay 28 is used within only one color path, there is no need to design these components for a broad spectral range. In fact, in a preferred embodiment, the same basic design of reducing relay 82 and magnifying relay 28 is used, with lens spacing shifted suitably to compensate for wavelength-related differences, providing identical imaging at the output of the modulation path for each component color.

The arrangement of FIG. 5 also provides advantages for lowering cost and complexity requirements of projection lens 32. With the arrangement of FIG. 5, projection lens 32 can advantageously work at a higher f/# in order to project a multicolor image combined from magnified real image I formed in each color path, such as in the red path as shown. In addition, projection lens 32 needs only a small working distance to project the multicolor image onto display surface 40. Projection lens 32 can be, for example, a simple 5- to 7-element lens assembly that employs commonly available optical glass and is comparable in cost and complexity to commercially available cinema projection lenses used with motion picture film projection apparatus. This is in contrast to conventional digital cinema and large-scale electronic projection systems that typically require complex and costly projection lenses. It must also be noted that magnifying relays 28, because they are intended to handle only a portion of the visible spectrum, are inherently less complex and thus less costly than are relay lens assemblies used for light across the visible spectrum, such as those described in the U.S. Pat. Nos. 5,597,222 and 5,357,289 disclosures, as noted earlier in the background section.

For other types of spatial light modulator, polarizing beamsplitter 24 would not be necessary. Where a DMD device or transmissive LCD is employed as spatial light modulator 30, light from reducing relay 82 goes directly to spatial light modulator 30, as is shown subsequently. Where a DMD is used as spatial light modulator 30 appropriate adaptations would be made to the imaging optics path, such as substitution of a Total Internal Reflection (TIR) beamsplitter for polarizing beamsplitter 24, as is well known in the digital projection art.

Figure 6:
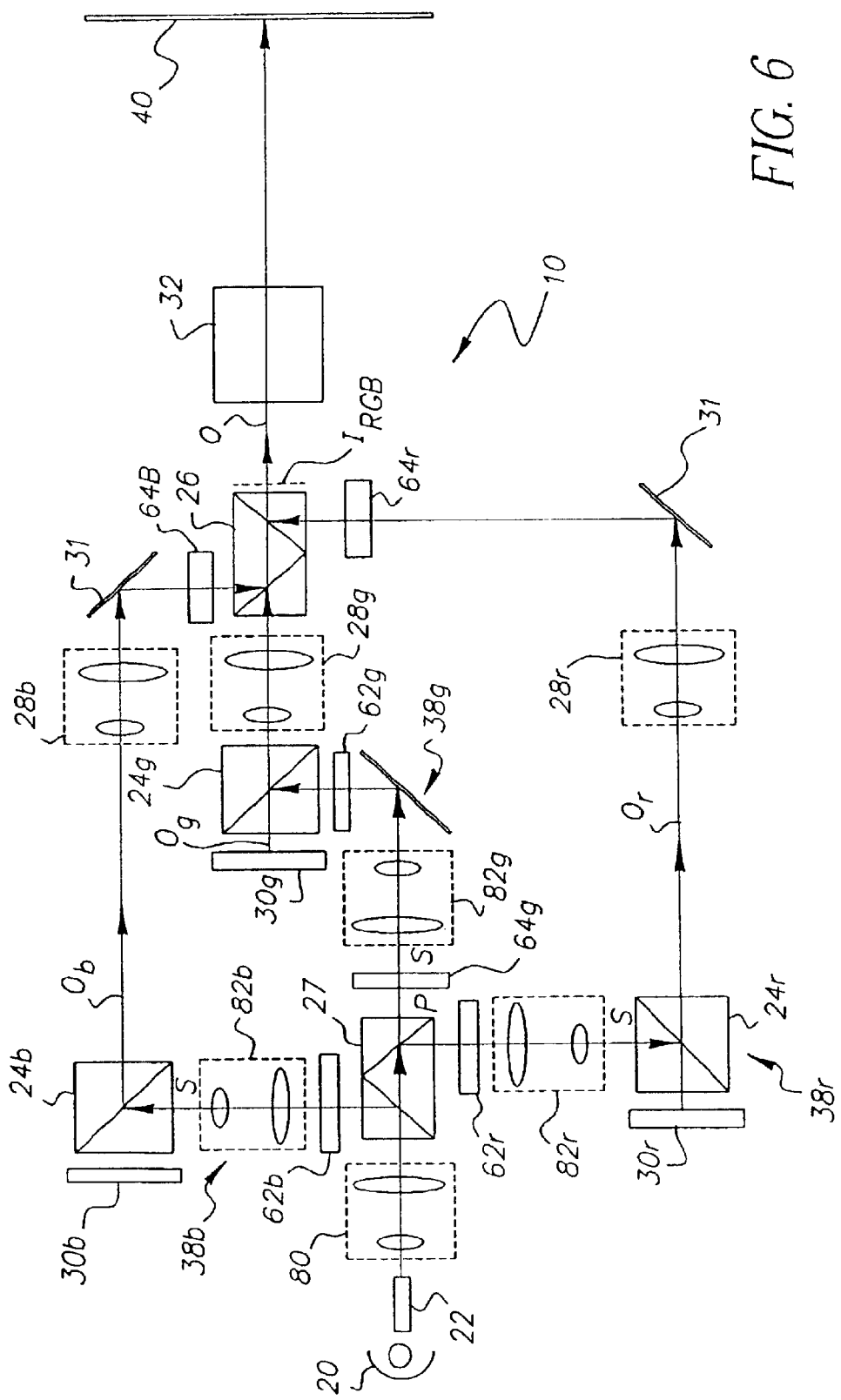
FIG. 6 is a schematic view showing key components of a projection apparatus according to the present invention.

Referring now to FIG. 6, there is shown a schematic block diagram of projection apparatus 10 showing all three color modulation paths. Uniformized light from light source 20 is split into red, green, and blue light at dichroic separator 27. In a red light modulation assembly 38$r$, a red reducing relay 82$r$ demagnifies the red light and directs this light to a red spatial light modulator 30$r$, with a red polarizing beamsplitter 24$r$ to provide modulated light along a red optical axis $O_r$. A red magnifying relay lens 28$r$ then directs the modulated light on red optical axis $O_r$ to dichroic combiner 26. A turning mirror 31 may be used if needed in the optical path. Similarly, in a green light modulation assembly 38$g$, a green reducing relay 82$g$ demagnifies the green light and directs this light to a green spatial light modulator 30$g$, with a green polarizing beamsplitter 24$g$ to provide modulated light along a green optical axis $O_g$. A green magnifying relay lens 28$g$ then directs the modulated light on green optical axis $O_g$ to dichroic combiner 26. As FIG. 6 shows, dichroic combiner 26 is a V-prism in a preferred embodiment, rather than the X-prism that is conventionally employed for this purpose, as was represented in FIG. 5. Likewise, in a blue light modulation assembly 38$b$, a blue reducing relay 82$b$ demagnifies the blue light and directs this light to a blue spatial light modulator 30$b$, with a blue polarizing beamsplitter 24$b$ to provide modulated light along a blue optical axis $O_b$. A blue magnifying relay lens 28$b$ then directs the modulated light on blue optical axis $O_b$ to dichroic combiner 26. A multicolor magnified real image $I_{rgb}$ is then projected by projection lens 32 to display surface 40. (It must be pointed out that FIG. 6 is a schematic drawing and does not intend to represent relative path lengths for each modulated color; the best arrangement is to have equal optical path lengths among all colors, as is well known in the optical design arts. In a preferred embodiment, as is described subsequently with reference to FIGS. 7 and 8, optical path lengths are equal for each color.)

In a preferred embodiment, V-prism dichroic separator 27 defines the colors with spectral band rejection edges. As shown, the V-prism dichroic separator 27 comprises two internal coated surfaces sandwiched between three prisms, which are nominally made from optical quality glass. For example, an optical coating deposited on prism substrate at the first internal surface of dichroic separator 27 reflects blue light while transmitting red and green light. An optical coating on the orthogonal second internal surface of dichroic separator 27, in turn, reflects red light while transmitting blue and green light. However, for improved system color gamut, further filtering of the separated light from dichroic separator 27 is accomplished using color filters. In each color path of projection apparatus 10 as shown in FIG. 6, filtering is provided by a color filter: red light modulation assembly 38r comprises a red color filter 62r, green light modulation assembly 38g comprises a green color filter 62g, and blue light modulation assembly 38b comprises a blue color filter 62b. Color filters 62r, 62g, and 62b can be, for example, band edge or band pass filters.

In summary, the projection apparatus 10 of the present invention incorporates several design features to limit any potential color shading. In the illumination system, the base condenser relay 80 provides a light beam into the dichroic separator 27 which is larger than is required at the spatial light modulators 30. This reduces the angles (numerical aperture) through the dichroic separator 27, which makes the internal coatings easier to fabricate and reduces the variable color response with angle. Likewise, the light beams provided by the imaging or magnifying relays 28 are enlarged, as compared to the light beam size required at the spatial light modulators 30, so as reduce the numerical aperture at the dichroic combiner 26, and thus also reduce the variable color response with angle through the aforementioned dichroic combiner 26. Then, as has been further discussed, in the preferred embodiment, the optical system conditions the light beams to be nominally telecentric at both the dichroic separator 27 and the dichroic combiner 26. As was discussed in relation to FIGS. 2a–2d telecentricity is advantageous as it provides light of equal numerical aperture at all field points, which helps to further reduce color shading when the light interacts with dichroic surfaces located in telecentric space. The projection apparatus 10 of the present invention is provided with further design features to mitigate against color shading. As one further example, each of the color filters 62r, 62g, and 62b, which are used to clarify the individual color spectra after dichroic separator 27 splits the incident white light into three color beams, are normal incidence dichroic filters. Thus, as compared to the dichroic coated surfaces within dichroic separator 27 and dichroic combiner 26, which have their coated surfaces located on tilted planes (nominally at 45° to the light beam), normal incidence operation reduces the potential for color response variation with angle. Furthermore, these color filters 62 are preferentially located in telecentric space, near the dichroic separator 27 or the spatial light modulators 30 (see FIG. 6) so as to reduce color response variation with angle across the imaged field (reduced color shading). As will be discussed later, the projection apparatus 10 is also provided with other features to mitigate against color shading, including the design the color polarization aspects of the design, and the use of fused silica glass in the construction of the V-prisms.

Projection apparatus 10 of the present invention is preferably designed with a dual color polarization optical approach where a first color band has light of a first polarization state, and the second and third color bands have light of a second polarization state. More specifically, the two polarization states are of an orthogonal orientation, and the first color band comprises a nominally green light spectrum. (Note that S-polarized light corresponds to the polarization state that is always parallel to the incident surface that incoming light is interacting with, whereas P-polarized light is the polarization state that can "plunge" into the incident surface.) In particular, in a preferred embodiment, V-prism dichroic separator 27 provides red and blue light having S-polarization state while green light has P-polarization. Likewise, dichroic combiner 26 preferentially combines red and blue light having S-polarization with green light having P-polarization. This configuration is preferable, as the color response curves for the optical coatings within the dichroic separator 27 and dichroic combiner 27 are partially de-coupled. In particular, the blue and red spectral regions are defined by the S-polarization response of the respective coatings, and these spectra can overlap into the green without reducing the green spectra, as the green light exiting the dichroic separator 27 that is used is P-polarized. The light exiting the green channel of dichroic separator 26 comprises both green S-polarized light and green P-polarized light, but, by design, the green P-polarized light spectrum is wider than the green S-polarized light spectrum, and likely overlaps into the high blue and low red wavelengths. Likewise, the light emerging from dichroic separator 27 in the blue and red channels contains both S-polarized and P-polarized light, but as the S-polarized light spectra is broader (more light) than the P-polarized light spectra, the two colors are generally considered to be S-polarized. In short, the dichroic separator 27 can be said to provide red, green, and blue beams (RGB) that have a preferred SPS polarization configuration.

Figure 12:
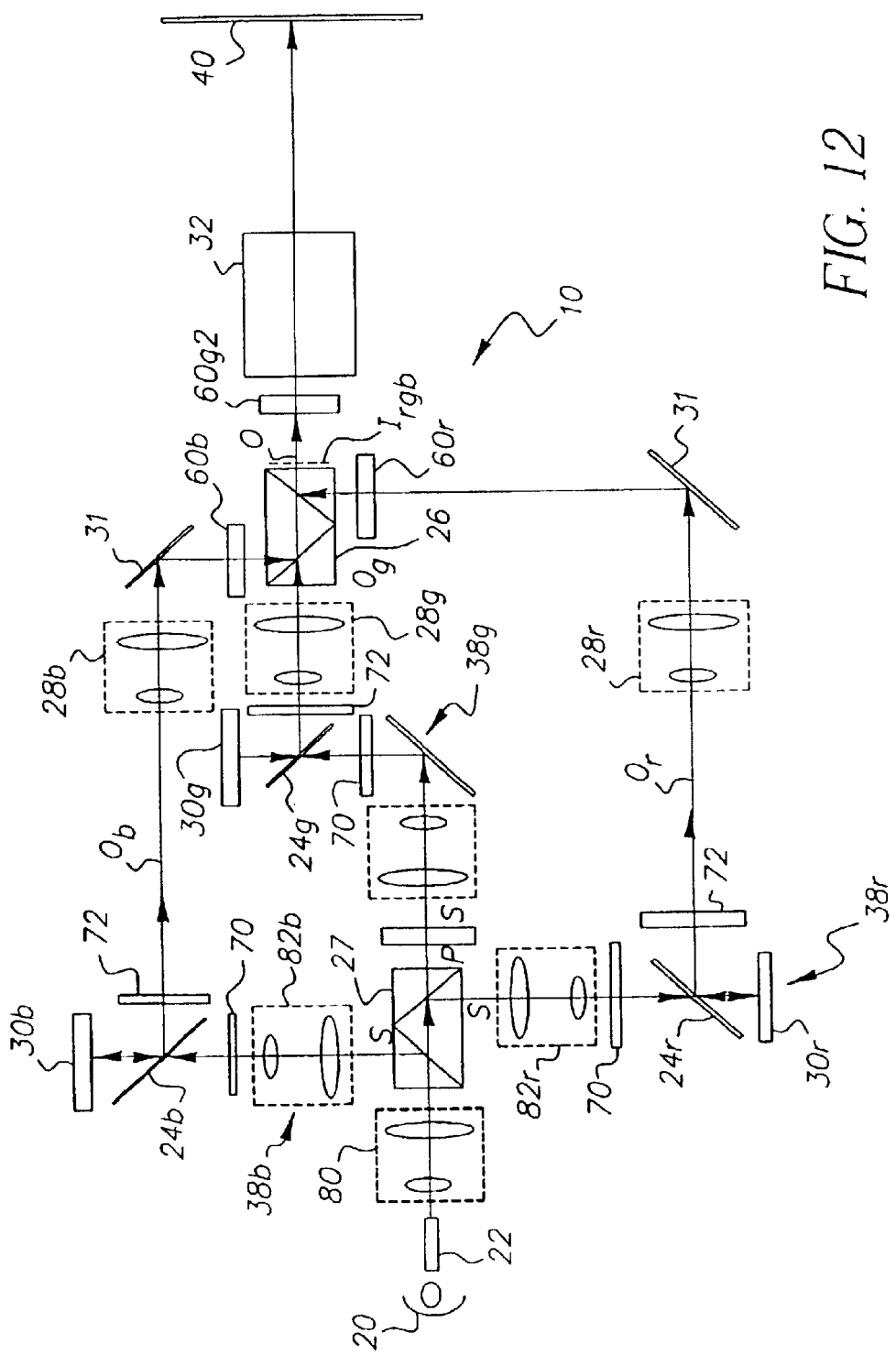
FIG. 12 is a schematic view showing key components of a projection apparatus in yet another alternative embodiment of the present invention, using prepolarizer and analyzer components in each color path.

The polarization state at the spatial light modulators is defined by the polarization beamsplitter 24. In the preferred embodiment of the present invention (shown in FIG. 12), the polarization beamsplitters 24 are wire grid polarization beamsplitters. As described in prior art patents, including U.S. Pat. No. 6,243,199 (Hansen et al.) and U.S. Pat. No. 6,532,111 (Kurtz et al.), wire grid polarization beamsplitters preferentially reflect S-polarized light and transmit P-polarized light. The optical system can be configured as shown in FIG. 12, where the imaging light that emerges from the spatial light modulators 30 is reflected off of the wire grid polarization beamsplitters 24 and then passes into the magnifying relay lenses 28. This configuration is preferable, as compared to a transmissive configuration through the wire grid polarization beamsplitters 24, as the contrast is higher. Thus, for optimal operation, the light incident onto the spatial light modulators 30 is P-polarized (transmitted through the wire grid polarization beamsplitter) in each color channel, and the image light emerging spatial light modulators 30 and reflected off the wire grid polarization beamsplitters is S-polarized in each color (see FIG. 12).

As it happens that the actual opto-mechanical design switches polarization state orientations due to the configuration of reflections, such that the S- and P-polarizations at the dichroic separator 27 and the dichroic combiner 26, have the opposite meaning to S and P polarizations at the polarization beamsplitters 24. Thus, dichroic separator 27 outputs red, green, and blue light (RGB) of an SPS orientation (relative to the polarization orientations in each color that have the most light). At the wire grid polarization beam splitters of FIG. 12, the transmitted P-polarized light needs to be maximized. As orientational changes have defined the RGB/SPS output from dichroic separator 27 as RGB/PSP incident towards the respective polarization beamsplitters 24, the green channel has the wrong orientation. Thus, in order to maximize system light efficiency, the P-polarized green light emerging from dichroic separator 27 needs to be converted to S-polarized light (which by orientation, will then be P-polarized at the polarization beamsplitter). Therefore, the projection apparatus 10 is provided with a green channel halfwave plate 64g (see FIG. 6) or a green channel color selective polarization filter 60g (see FIG. 12) to rotate the polarization state of the green light.

Subsequently, the light in each channel encounters one or more polarizers (the polarization beamsplitter 24 used in FIG. 6, or the polarization beamsplitter 24 and pre-polarizer 70 used in FIG. 12), and light of a defined polarization state is removed. In the preferred construction, in each color channel, the S-polarized light is removed and the P-polarized light is provided to the spatial light modulator 30. The spatial light modulators 30 are modulated with image data, by which some light is converted to S-polarization, while other light remains P-polarized. Preferably, for high contrast systems, the spatial light modulators 30 are driven from dark state (off state voltages) to the bright state (on state voltages). Considering again FIG. 12, the image bearing S-polarized light reflects off of the wire grid polarization beamsplitters 24 and into the magnifying relays 28. Thus, the emerging color beams have an RGB/SSS polarization orientation. The dichroic combiner 26, which may be identical to the dichroic separator 27, prefers and RGB/SPS orientation. Internal orientations of the dichroic surfaces within dichroic combiner 26 mean that the RGB/SSS emerging color beams from the wire grid polarization beamsplitters 24 appear as RGB/PPP to the dichroic combiner 26. This means that the green light beam has the correct polarization orientation, but the red and blue beams are orthogonally mis-aligned. Therefore, the projection apparatus 10 can be further configured with halfwave plates (64b and 64r in FIG. 6) or with color selective polarization filters (60b and 60r in FIG. 12) to correct the polarization orientations of the red and blue beams.

Figure 4:
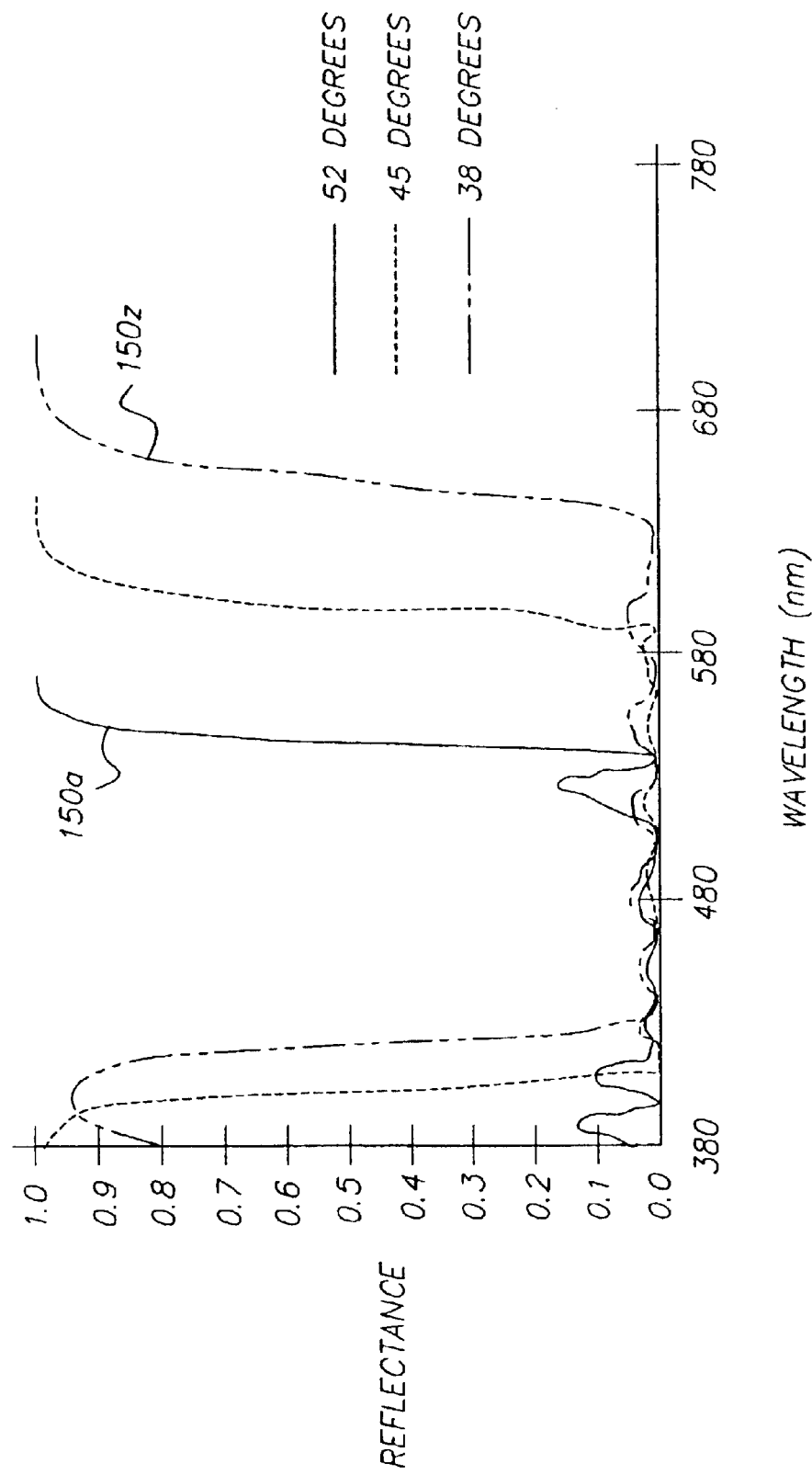
FIG. 4 is a graph showing s-polarity reflectance versus wavelength for a dichroic surface, at a range of incident angles.

As was discussed previously, it is preferable to design projection apparatus 10 with a dual color polarization optical approach in which a first color band has light of a first polarization state, and the second and third color bands have light of a second polarization state. Moreover, in greater detail, it has been described that is preferable to have red and blue light with an S-polarization state and green light with a P-polarization state as the color light beams traverse dichroic separator 27 and dichroic combiner 26. This is because the green spectral design is partially de-coupled from the red and blue spectral designs, and each of the color bands can be broadened to the extent that the even overlap. Subsequently, projection apparatus 10 is provided with the previously mentioned color filters 62r, 62g, and 62b, which clarify and define each of the color spectra and the combined color gamut. As such, the degree of respective overlap of the red and blue spectra with the green spectra can be reduced or even eliminated. The dual color polarization orthogonal configuration (RGB/SPS) through the dichroic separator 27 and the dichroic combiner 26 also helps to reduce the system sensitivity to color shading, as the angular fall-off of the spectral curves can spill into the adjacent color (see FIG. 4). The color variation with angle in each color is then significantly reduced by the use of the normal incidence color filters 62r, 62g, and 62b and the telecentric light provided through the traverse dichroic separator 27 and dichroic combiner 26. Note that dichroic separator 27 can alternately be designed to provide colored light having other polarization characteristics, such as the same polarization state, for example. However, this requires more costly fabrication, as the internal dichroic coatings are more difficult. For example, dichroic separator 27 can be designed to provide all three colors having a common polarization state (S-polarization, for example). This can be advantageous, as an optical component (green halfwave plate 64g) is eliminated, while polarization conversion (see for example, U.S. Pat. No. 5,978,136 by Ogawa) of the light from light source 20 can be employed.

As described in the background material given above, projection apparatus 10 provides a high level of performance by maximizing brightness and by minimizing color shading and related aberrations. Using conventional design approaches, however, dichroic surfaces at dichroic separator 27 or at dichroic combiner 26 constrain brightness. Increasing the brightness of available light in the system comes at the expense of allowing higher incident light angles at the various dichroic surfaces. The resulting color shift across the field degrades color performance and degrades the overall efficiency of the system. The arrangement of FIGS. 5 and 6 overcome this problem by conditioning the angle of incident light at key points in the system. First, maximum uniformity is achieved where uniformizing optics 22 operate with a low f/#. With the configuration of FIGS. 5 and 6, uniformizing optics 22, an integrating bar in a preferred embodiment, effectively operates at approximately f/1.31. This low f/# allows the light traveling through the integrating bar to have multiple bounces through the bar and also allows integrating bar dimensions to be minimized. However, this also means that uniformized light emerges at high incident angles, which are not favorable at dichroic separator 27. At the same time, the size of the surface at output A of uniformizing optics 22 is small relative to the size of the imaging surface of corresponding spatial light modulators 30, 30r, 30g, and 30b. In order to correct for these angular and size disadvantages, base condenser relay 80 provides approximately Nx=3.5× magnification to the uniformized output of uniformizing optics 22. This magnification effectively provides incident light to dichroic separator 27 at plane B f/4.6, well within the acceptable range for conventional dichroic surfaces. The magnified image of output A is, however, now too large relative to the surface of spatial light modulators 30, 30r, 30g, and 30b. Reducing relays 82, 82r, 82g, and 82b, therefore, provide Sx=0.5× magnification. This not only reduces the image size of uniformizing optics 22 output, but also increases the incidence angle of the illumination provided to spatial light modulators 30, 30r, 30g, and 30b, delivering illumination at approximately f/2.3, which is within a desirable range for most LCD and other spatial light modulators 30, 30r, 30g, and 30b. Thus, by magnifying and demagnifying the uniformized illumination output at key points, the apparatus of the present invention optimizes brightness and minimizes color degradation that would otherwise be caused by high incident angles at dichroic separator 27. It must be emphasized that each color light modulation path (for example, red, green, and blue) has a separate reducing relay 82r, 82g, and 82b. This arrangement allows reducing each relay 82r, 82g, and 82b to be designed for best performance over a specific range of wavelengths.

Combined multicolor magnified image $I_{rgb}$ is then formed by re-imaging each spatial light modulator 30r, 30g, 30b with its respective magnifying relay 28 at a nominal magnification Rx=2×. It is instructive to note that, from the perspective of projection lens 32, combined multicolor magnified image $I_{rgb}$ may be a real image or a virtual image, depending on where the individual magnified real images I in each color path are formed relative to the spatial position of dichroic combiner 26. Combined multicolor magnified image $I_{rgb}$ forms a real image whenever the individual magnified real images I are formed between the front surface of dichroic combiner 26 and the rear of projection lens 32. This arrangement is indicated by the position of combined multicolor magnified image $I_{rgb}$ in FIG. 6. In contrast, if the individual magnified real images I are formed between the front surface of magnifying relay lenses 28r, 28g, and 28b and the front surface of dichroic combiner 26, combined multicolor magnified image $I_{rgb}$ is a virtual image with respect to projection lens 32. That is, there is no actual spatial "location" of combined multicolor magnified image $I_{rgb}$ in such a case. Instead, dichroic combiner 26 operates to combine the individual magnified real images I in each color path as a virtual combined multicolor magnified image $I_{rgb}$.

Whether combined multicolor magnified image $I_{rgb}$ is a real image or a virtual image, projection lens 32 is then designed with the necessary back focal length for projecting combined multicolor magnified image $I_{rgb}$ to display surface 40, from wherever combined multicolor magnified image $I_{rgb}$ is formed. Projection lens 32 may alternately incorporate an anamorphic attachment for adjusting the aspect ratio of the projected image, as is well known in the image projection arts.

As described above, the combined multicolor magnified image $I_{rgb}$ is a real image that is nominally twice the size of the area image provided by spatial light modulator 30. As a result, the first lens elements of projection lens 32 can be relatively large, particularly when compared to a standard cinema lens used for film projection. However, most of the lens elements within projection lens 32 are comparable in size and tolerance to lens elements used in standard cinema lenses. As it is located in the vicinity of enlarged, combined multicolor magnified image $I_{rgb}$, dichroic combiner 26 can also be relatively large. However, the fabrication of dichroic combiner 26 (whether using the X-prism configuration of FIG. 5 or the V-prism configuration of FIG. 6) is greatly simplified because light at that component has a reduced f/#. As an example, where projection apparatus 10 operates at f/2.3 at spatial light modulators 30 and the magnification of magnifying relay 28 lenses is Rx=2×, then the beam incident to dichroic combiner 26 is a relatively slow F/4.6.

Figure 1:
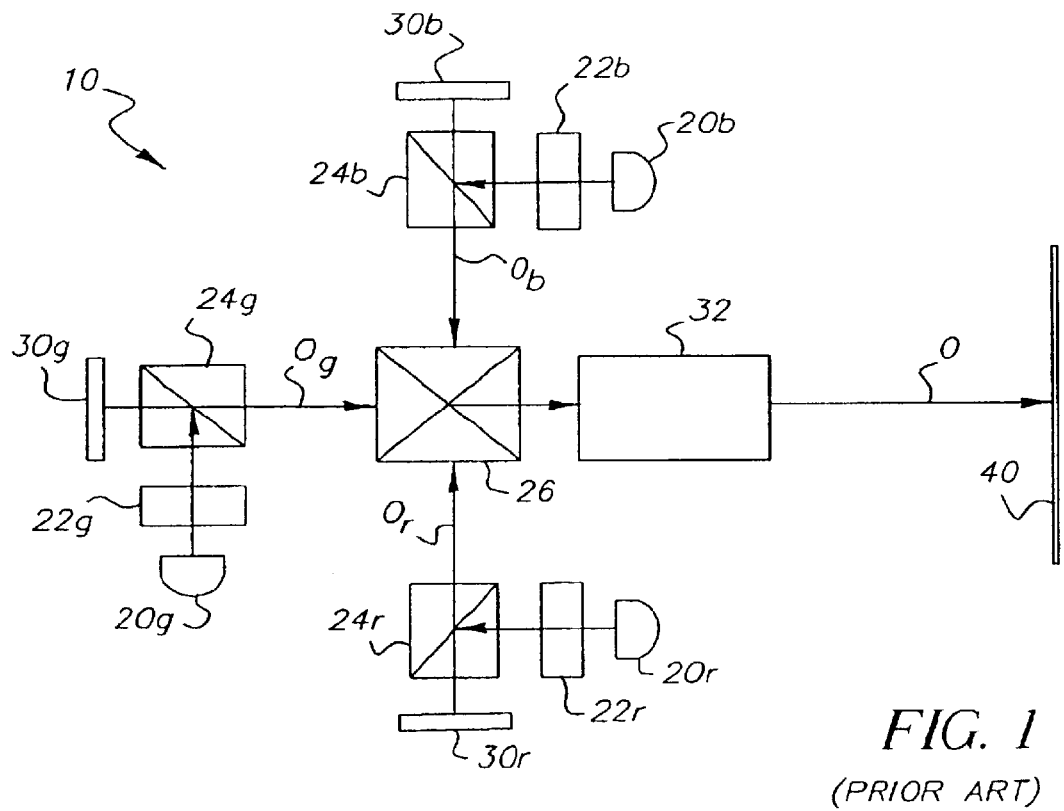
FIG. 1 is a schematic block diagram showing major components of a conventional, prior art digital projection apparatus.
Figure 2A:
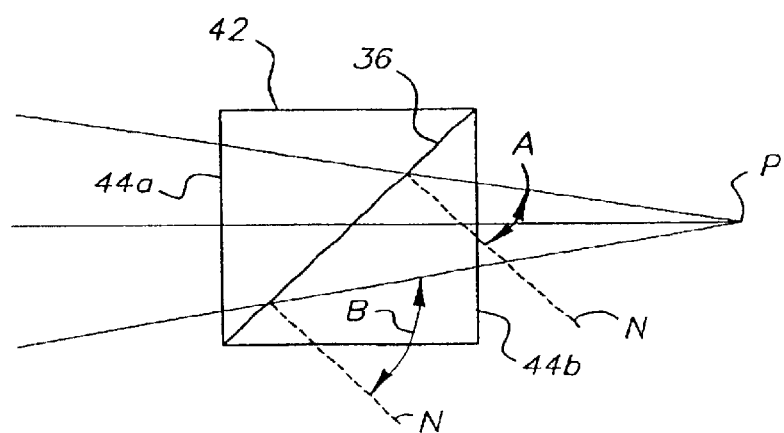
FIGS. 2a and 2b are ray diagrams showing incidence of light upon a dichroic coating at two different f/# values.
Figure 2B:
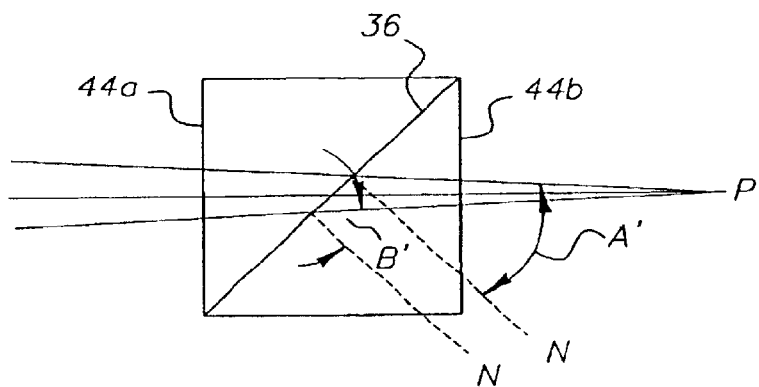
Figure 2C:
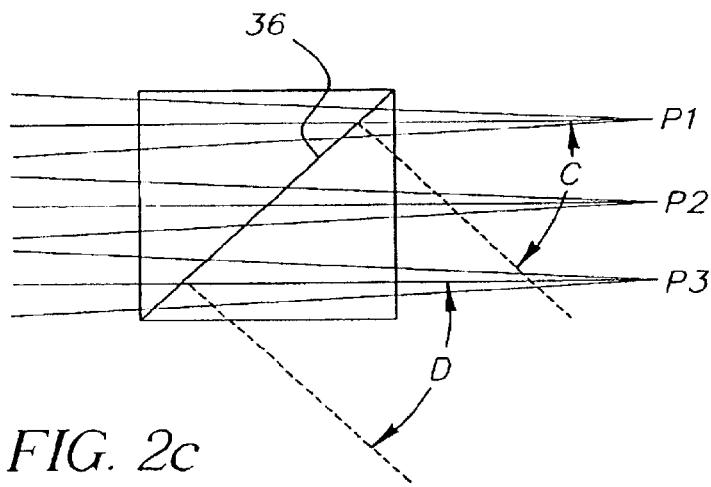
FIGS. 2c and 2c are ray diagrams showing non-telecentric and telecentric light incident upon a dichroic coating.
Figure 2D:
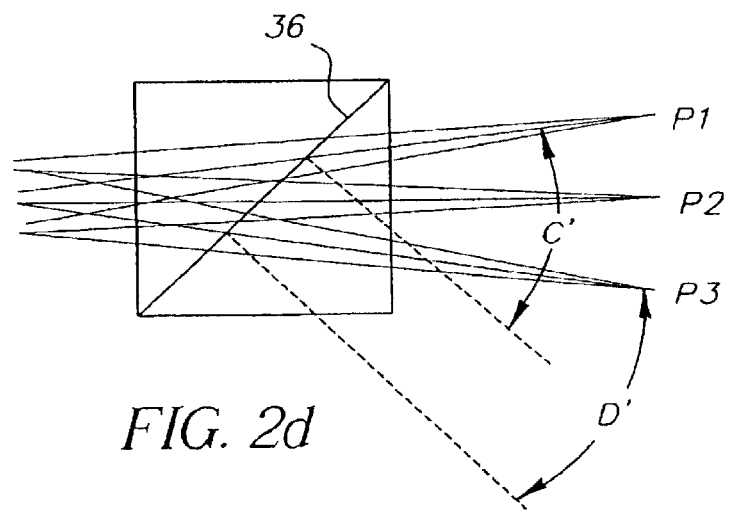
Figure 3A:
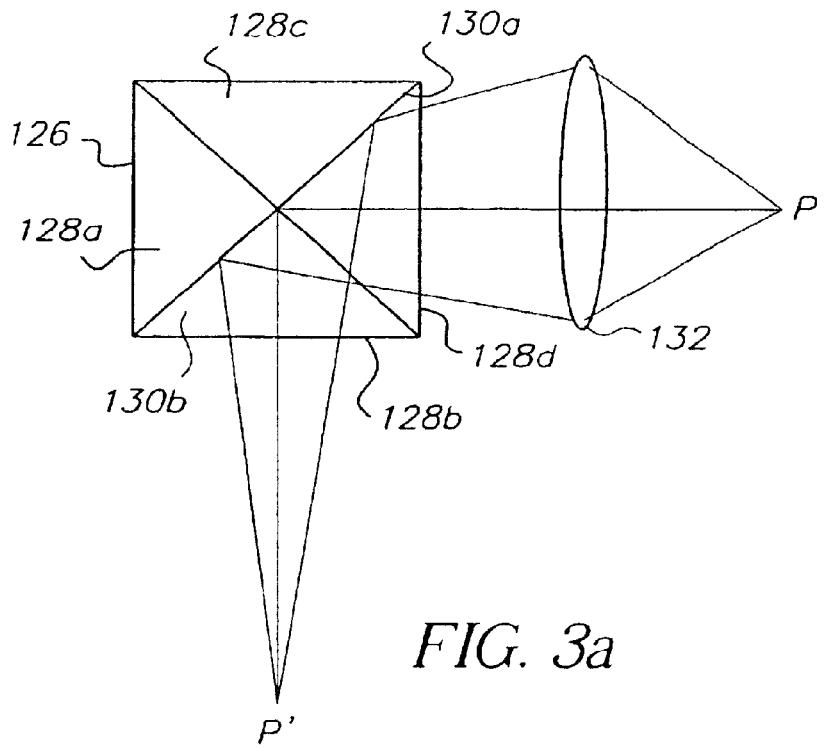
FIG. 3a shows the imaging response of an idealized X-cube.
Figure 3B:
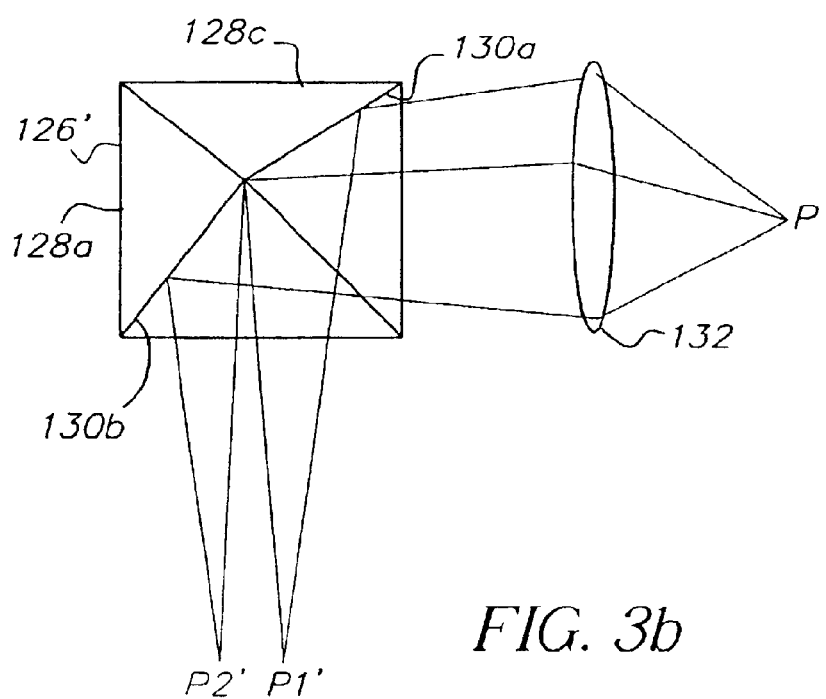
FIG. 3b shows the imaging response of an X-cube having slight misalignment errors.

As a practical example, for projection apparatus 10 using spatial light modulators having a 1.3" diagonal, with internal magnification Rx=2×, the combined multicolor magnified image $I_{rgb}$ at plane I has a image diagonal of 2.6". Although dichroic combiner 26 is relatively large, it is actually comparable in size to similar combiners used in prior art projection systems, as shown in FIG. 1, where both polarizing beamsplitter 24 and dichroic combiner 26 are located between spatial light modulator 30 and projection lens 32. On the other hand, although the size is comparable, the speed is reduced by the magnification Rx of magnifying relay lens 28, thereby easing the fabrication requirements on both the finished glass and the coatings. In the exemplary system, the illumination system has a magnification from plane B to spatial light modulator 30 of Sx=0.5×, and a magnification from spatial light modulator 30 to the combined multicolor magnified image $I_{rgb}$ of Rx=2.0×. This means that dichroic separator 27 and dichroic combiner 26 are the same size, and may even be identical components, as is shown in FIG. 6.

The high f/# requirements, smaller relative size, reduced number of components, and relaxed tolerances made possible by the present invention reduce the cost and complexity of projection lens 32 design for digital projection. Projection lens 32 can therefore be designed to be easily interchangeable, such as for different screen sizes for example.

Figure 7:
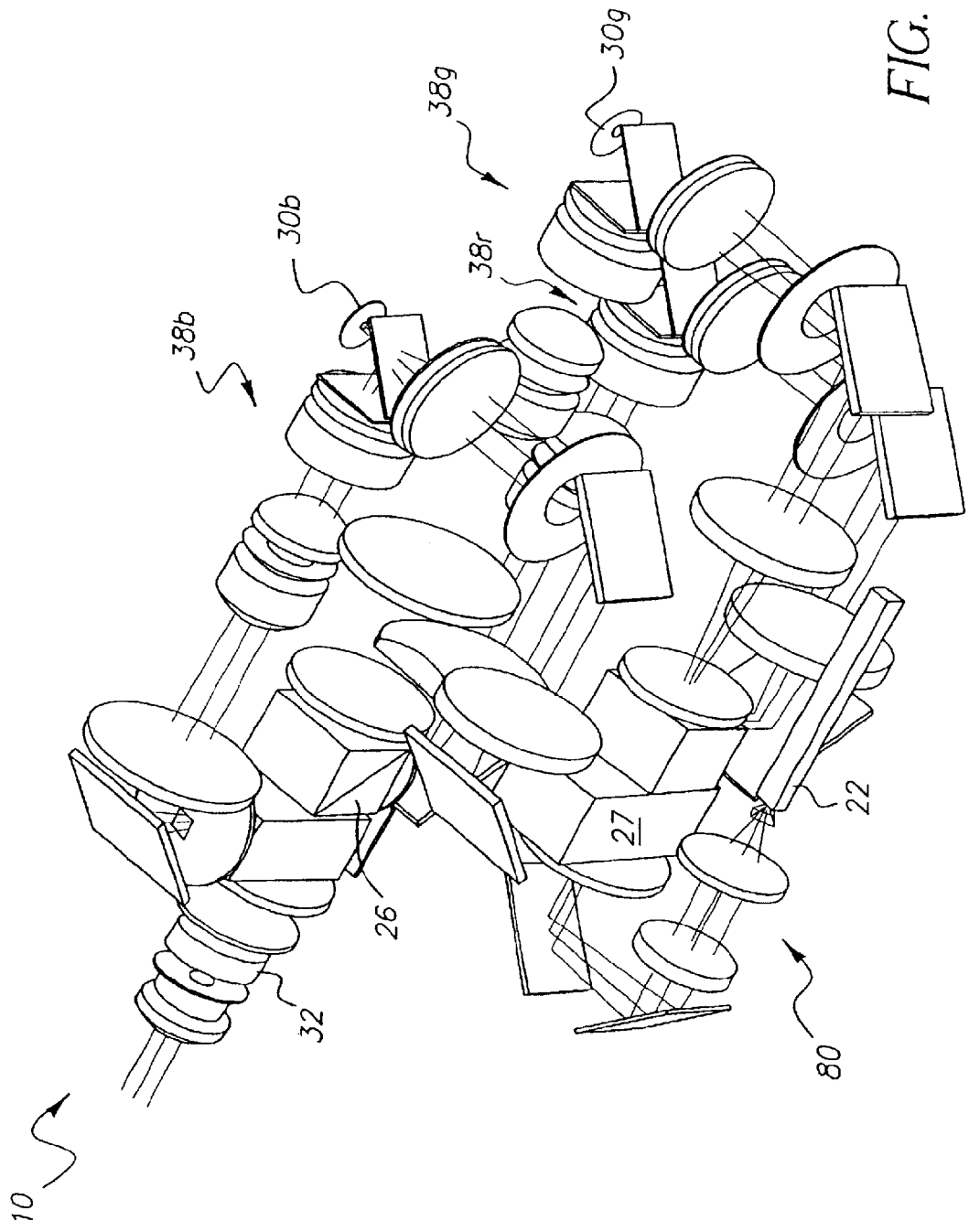
FIG. 7 is a side perspective view showing one possible arrangement of illumination optics using the present invention.
Figure 8:
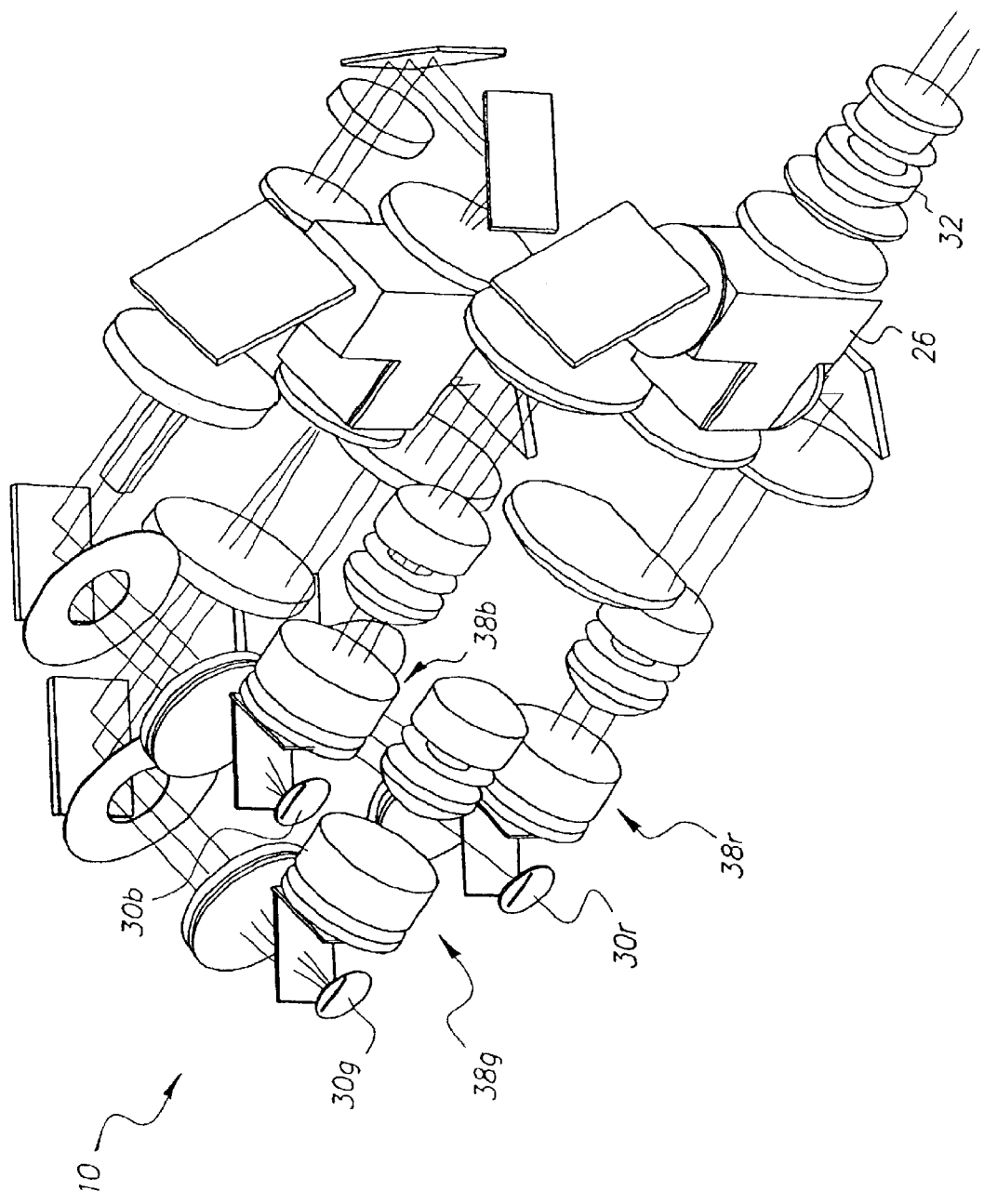
FIG. 8 is a frontwise perspective view showing one possible arrangement of illumination optics using the present invention.

Referring to FIGS. 7 and 8, there is shown, from two different perspective views, an arrangement of light modulation assemblies 38r, 38g, and 38b and illumination path components as packaged in a preferred embodiment.

Figure 9:
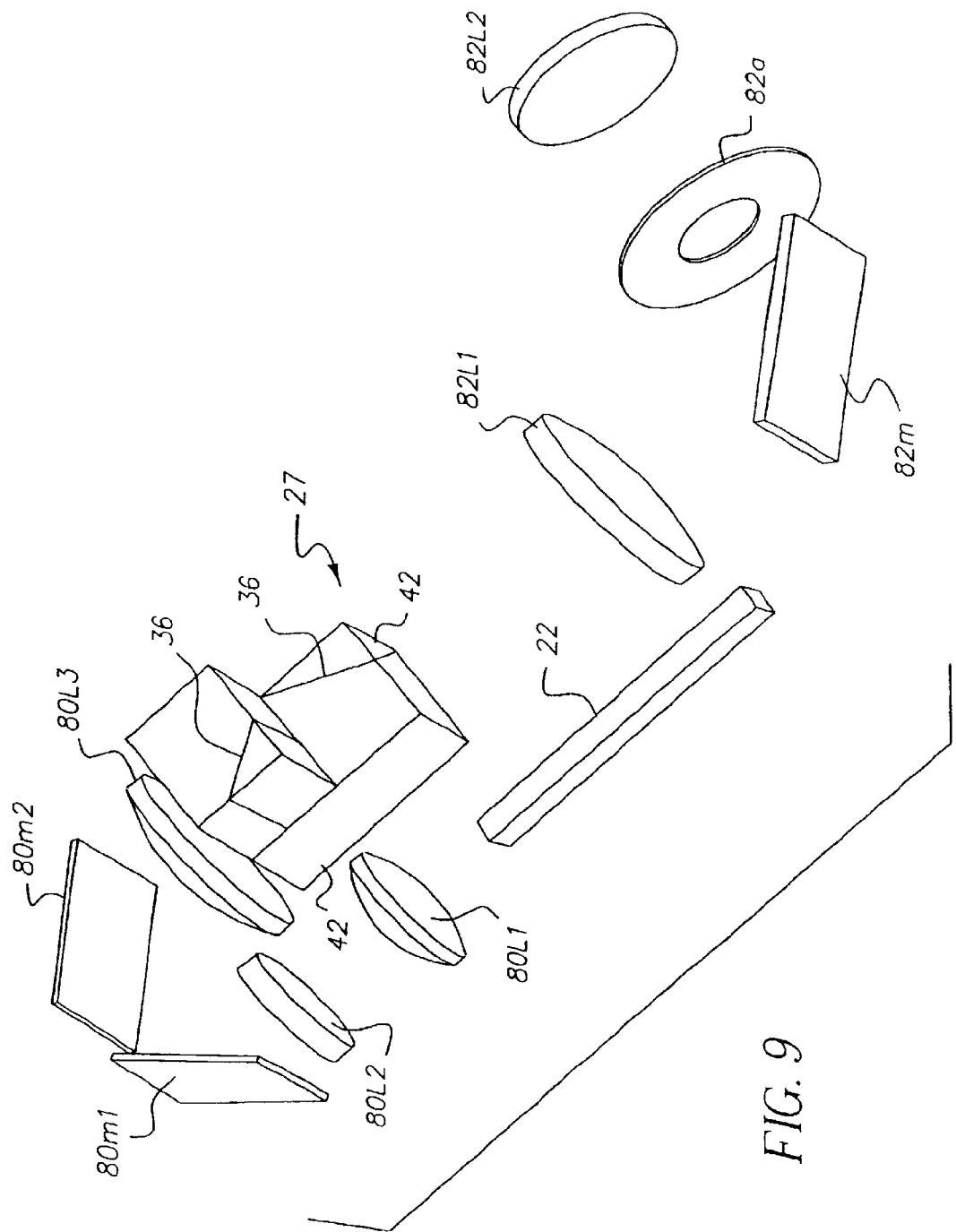
FIG. 9 is a perspective view showing some of the key optical components in the illumination path.

Referring to FIG. 9, there is shown a perspective view of key components of base condenser relay 80 and reducing relay 82 in a preferred embodiment. In this configuration, base condenser 80 consists of lenses 80/1, 80/2, and 80/3. Two mirrors 80m1 and 80m2 fold the light path and direct light to dichroic separator 27. Here, dichroic separator 27 has inner dichroic surfaces 36 within transparent prisms 42.

Reducing relay 82 consists of two lenses 82/2 and 82/2 with a folding mirror 82m and an aperture 82a. Reducing relay 82 is also double-telecentric, which helps to minimize color shifts due to angular response characteristics of dichroic separator 27 and to minimize contrast loss due to the angular response of spatial light modulator 30.

Both dichroic combiner 26 and dichroic separator 27 could also be an X-cube or X-prism, a Philips prism, or an arrangement of dichroic surfaces 36 that provide a color splitting function, such as an arrangement of dichroic coated optical plates (rather than prisms). In general, there is greater freedom in using alternate constructions for the dichroic separator 27 than for the dichroic combiner 26, because the illumination system can accept looser manufacturing tolerances and different configurations more readily than can the imaging system. The choice of optical materials used for the substrates (prisms or plates) for the dichroic combiner 26 and dichroic separator 27 can be important, particularly with regards to avoiding stress birefringence and color or contrast shading.

Figure 10:
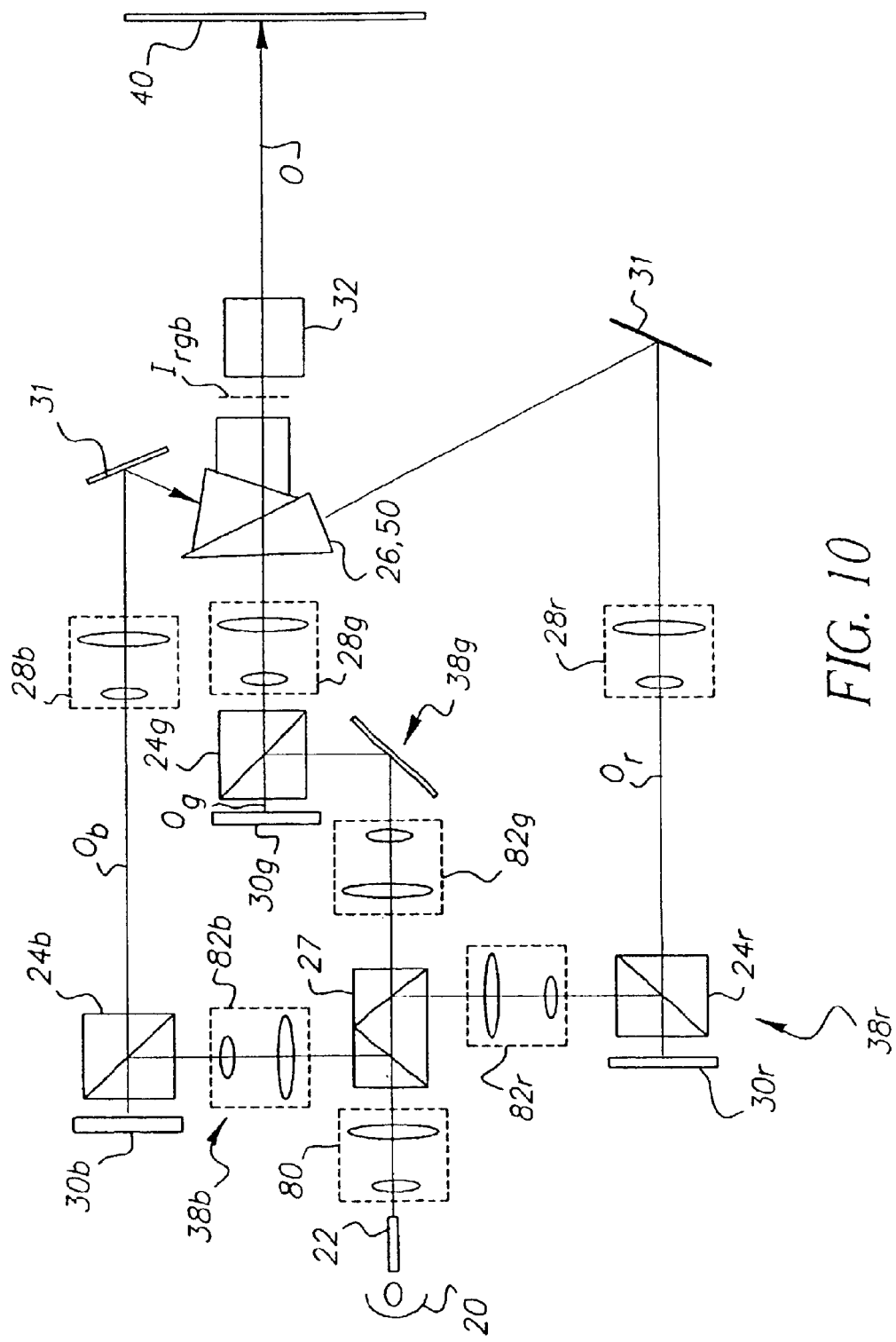
FIG. 10 is a schematic view showing key components of a projection apparatus in an alternative embodiment of the present invention using a Philips prism.

Referring to FIG. 10, there is shown an alternate embodiment of projection apparatus 10 in which a Philips prism 50 is deployed as dichroic combiner 26. As is suggested in FIG. 10, various optical axes $O_r$ and $O_b$ have oblique angles with respect to Philips prism 50, as is well known in the optical arts.

Figure 11:
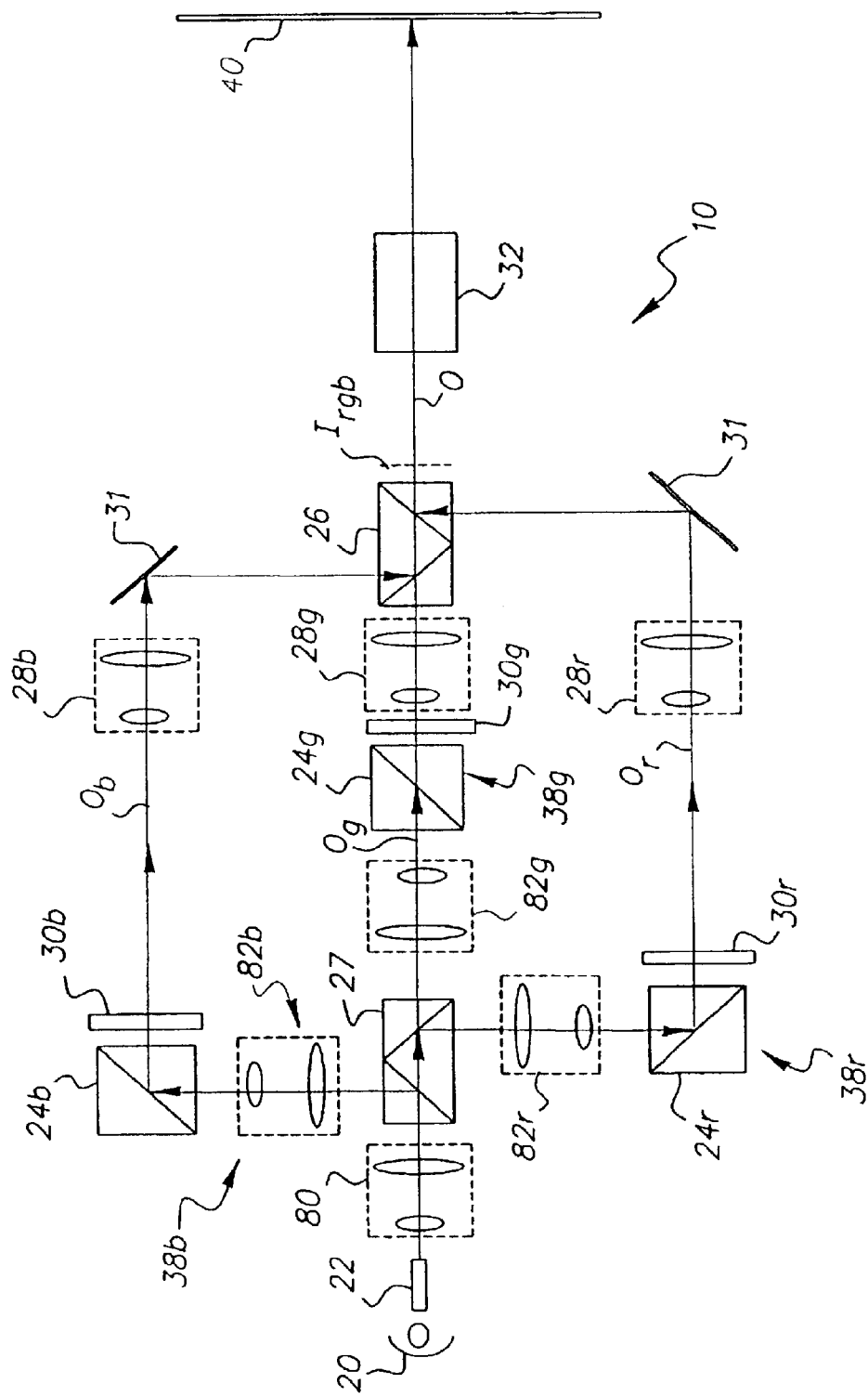
FIG. 11 is a schematic view showing key components of a projection apparatus in an alternative embodiment of the present invention using transmissive LCDs as spatial light modulators.

Referring to FIG. 11, there is shown yet another alternate embodiment of projection apparatus 10 in which transmissive LCDs serve as spatial light modulators 30r, 30g, and 30b. Some type of pre-polarizer must be provided; in FIG. 11, polarizing beamsplitters 24r, 24g, and 24b are shown, but other suitable arrangements might be preferred, as is well known in the optical arts. One or more polarization analyzers 72 are also needed to follow after the modulators 30 in each color channel.

Figure 13:
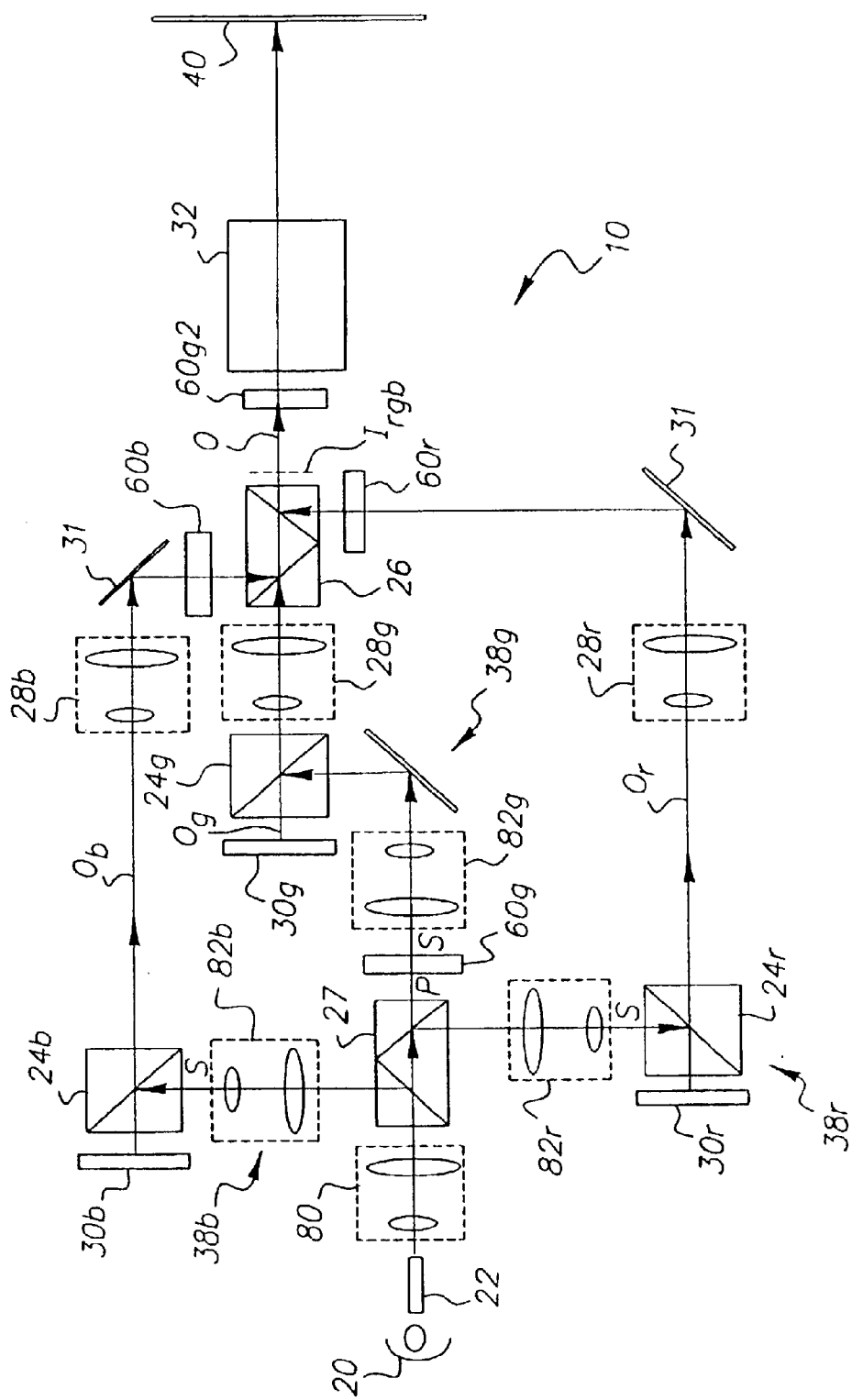
FIG. 13 is a schematic view showing key components of a projection apparatus in yet another alternative embodiment of the present invention, using, in each color path, a color filter combined with a half-wave plate.

Referring to FIGS. 12 and 13, there are shown additional alternate embodiments of projection apparatus 10, with some alternative and optional components disposed within each color path. In FIG. 12, polarizing beamsplitters 24r, 24g, and 24b are represented more accurately as wire grid polarizing beamsplitters. Additional polarization devices include, in each color path, a prepolarizer 70 and an analyzer 72. Prepolarizer 70 and analyzer 72 are preferably both wire-grid polarization devices, rather than conventional, coatings-based polarization components. Alternately, it may be possible to utilize the giant birefringence polarizers developed by 3M, for the prepolarizer 70, the analyzer 72, or the polarizing beamsplitter 24. U.S. Pat. No. 5,962,114 (Jonza et al.) provides an example of such a polarizing device. Of course, these giant birefringence polarizers would require both the high contrast and thermal robustness nominally comparable to the wire grid polarizers to perform adequately to meet the demanding specifications of a digital cinema (or other large screen) projection system.

As another component alternative shown in both FIGS. 12 and 13, each red, green, and blue color path also employs a red, green, or blue color-selective polarization filter 60r, 60g, and 60b respectively. Color-selective polarization filter 60r, 60g, or 60b may be, for example, a retarder stack filter, such as disclosed in U.S. Pat. Nos. 5,243,455 and 5,132,826 (both to Johnson et al.) and U.S. Pat. Nos. 6,417,892 and 5,658,490 (both to Sharp et al.) and commercially available as a ColorSelect™ color filter from ColorLink, Boulder, Colo., for example. Using color-selective polarization filter 60r, 60g, or 60b allows a single component to perform color filtering and selective polarization modification. For example, red color selective polarization filter 60r, shown in FIG. 12, can replace both red color filter 62r and red color halfwave plate 64r, which are shown in the system of FIG. 6. Using this configuration, red color selective polarization filter 60r serves the function of halfwave plate 64r by rotating the modulated red light beam to be S-polarized, to match the preferred polarization state of dichroic combiner 26 for red light. Red color selective polarization filter 60r also serves the function of red color filter 62r to define the red color spectrum, and thus, the red portion of the color gamut.

Alternately, as again shown in both FIGS. 12 and 13, a color selective green polarization filter 60g2 has been provided after dichroic combiner 26, and preferably before projection lens 32. Color selective green polarization filter 60g2 converts the modulated P-polarized green light emerging from dichroic combiner 26 to S-polarized green light. Using this arrangement, modulated light from projection apparatus 10 would have the identical polarization state (S-polarization) for all three colors. This effect may be useful, for example, where display surface 40 exhibits polarization sensitivity, such as may be characteristic with high-gain screens.

With respect to FIGS. 6, 10, 11, 12, and 13, it must be noted that an ideal arrangement would provide optical paths of equal length for red, blue, and green color modulation. This design principle, difficult to represent in the schematic views of FIGS. 6, 10, 11, 12, and 13, is followed where possible in the component packaging arrangements of the preferred embodiment, as shown in FIGS. 7 and 8. It should be understood that although the optimal arrangement is to provide a fully telecentric light path in each color modulation channel, it may be advantageous to provide this arrangement in only one or two color channels for projection apparatus 10, for example. Alternately, it should be noted that while telecentricity can provide important advantages to the operation of both the imaging and illumination optical systems, there may be opportunities to relax this requirement in the illumination system, and thereby simplify that portion of the projection apparatus 10.

With these improvements, then, the present invention boosts the imaging performance of projection apparatus 10 and allows simpler, more compact optical design at minimal cost, particularly as compared to other polarization based projection systems that don't utilize intermediate imaging optics, color shading prevention, and wire grid polarizers and polarization beamsplitters.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, the amount of magnification provided by base condenser relay 80 can be any value greater than 1×, and should be suitably matched to the dimensions and characteristics of uniformizing optics 22 and of other components in the imaging path. Similarly, the demagnification provided at reducing relays 82r, 82g, and 82b and magnifying relay lenses 28r, 28g, and 28b should be matched to suit the characteristics of components within their respective light modulation assemblies 38r, 38g, and 38b.

Thermal decoupling of polarization components from spatial light modulators 30r, 30g, and 30b and from polarizing beamsplitters 24r, 24g, and 24b within projection apparatus 10 has been found to be especially effective in reducing color shifts and other aberrations that result from birefringence. A preferred embodiment uses insulated mounting mechanisms, heat sink elements, and ventilation, for example. Heat has also been identified as a potential source of stress birefringence for prisms used in dichroic combiner 26 and dichroic separator 27. To minimize this problem, a preferred embodiment for dichroic separator 27 as shown in FIG. 6 uses amorphous fused silica glass over more conventional types of prism glass, since fused silica has characteristically lower absorption when compared with other types of glass. Similarly, dichroic combiner 26 may also be made with fused silica to further assist in reducing color shading.

Likewise, in the case that prepolarizer 70 has significant light absorption, as can occur when prepolarizer 70 is a wire grid device, the resulting heat can be thermally transferred to the mechanical assemblies holding the polarizing beamsplitter 24 and the spatial light modulator 30. This transferred heat can cause each of the spatial light modulators 30r, 30g, 30b to move, which could throw off the convergence of the color images as seen at the screen. Certainly there are numerous potential design approaches which could be employed to mitigate this effect. A possibility includes moving the prepolarizer 70, as shown in FIG. 12, from its initial position in proximity to polarizing beamsplitter 70 and spatial light modulator 30 to another location in the system. For example in the blue channel, prepolarizer 70 could be moved apart from the assemblies which include polarizing beamsplitter 24b and spatial light modulator 30b, such that there is no direct thermal coupling. Prepolarizer 70 could actually be moved upstream, for example, to a new mounting location within the illumination optics, such as within the reducing relay 82b. Locating the prepolarizer 70 at an internal aperture stop plane within reducing relay 82b could be advantageous, as any angular response variations of the prepolarizer 70 would be minimized. However, locating the prepolarizer 70 upstream in this fashion introduces the concern that the intervening optical components (lenses for example) could experience mechanical of thermal stress birefringence, which could reduce the purity of the prepolarized light.

It should be noted that spatial light modulator 30 likely does not have an aspect ratio (of width to height) corresponding to the desired projected image aspect ratio. For example, spatial light modulator 30 may have an aspect ratio of 1.33:1. By comparison, the most common motion picture film projection format, known as "flat," has an aspect ratio of 1.85:1. This problem can be dealt with by providing the projection apparatus 10 with an anamorphic attachment lens (not shown) after the projection lens 32 (see FIG. 6), coupled with feeding the spatial light modulators 30 image data that has been spatially re-sized. As an example then, an anamorphic attachment lens with a one directional magnification of 1.39:1 will provide the desired 1.85:1 projected image. There are however, other semi-common motion picture image formats, including the 2.39:1 "cinemascope" format. In order to avoid providing a corresponding anamorphic attachment (with a 1.79:1 one dimensional magnification), the image can be formatted at a 1.72:1 aspect ratio on the modulators 30, effectively under filling the modulators. The modulator pixels not receiving image data are set to "black" (off-state), essentially providing an electronic letterboxing. However, in actual operation, an electronic letterboxing which is "black" according to the limits of the projection apparatus 10 (2,000:1 for example) may be considered insufficiently black by discriminating viewers, particularly when compared to the black surround of the darkened theatre. As one means to mitigate this problem, the projection apparatus 10 can be further equipped with a mechanical aperture to mechanically letterbox the image provided on the spatial light modulators 30. For example, in the system shown in FIG. 12, a letterboxing aperture 86 could be provided at the combined multi-color magnified image Irgb, which would clip light from the re-imaged spatial light modulators 30, on two side (top and bottom for example) of the image. Alternately, the letterboxing aperture could be an optical device, such as a transmissive LCD, but the result would likely be much less light efficient than with a mechanical aperture. The letterboxing aperture 86 could also be located in the illumination system, either at the uniformizing optics 22 or at the internal images within each of the color modulation paths. Most likely, in practice, electronic letterboxing would be used in combination with the letterboxing aperture 86, as both stray light effects and edge aperture effects could then be minimized.

Not shown or described in detail are a number of additional supporting polarization components conventionally used to improve contrast and performance of LCD spatial light modulators 30. A polarizer (not shown) could be deployed between uniformizing optics 22 and base condenser relay 80 or, optionally, in each color path before or after reducing relay 82. The present invention allows the use of any suitable type of illumination system for providing source colored light for modulation by spatial light modulators 30. Light source 20 could include various types of lamps, filters, LEDs, lasers or other illumination components. For an expanded or alternate color gamut, more than three color light modulation paths can be provided.

In addition to the frame sequential contrast metric discussed previously, projection systems are also benchmarked relative to in-frame or ANSI contrast. ANSI contrast is a measure of the dynamic range observed between a full black region of a projected image and an adjacent full white region. While in-frame contrast is the generic definition, the quantity is more widely referred to as ANSI contrast, in reference to an ANSI standard that specifies the commonly used measurement method. Typically ANSI contrast is measured using a checkerboard pattern of alternating black and white regions, with at least nine regions mapped across the screen. ANSI contrast can be measured by collecting light reflected off the screen, or by measuring the light incident to the screen. In the first instance, the measured ANSI contrast is reduced by light hitting the screen from secondary light sources, including theatre exit lights, stray light from the projection booth, and light scattered off of the seats and audience. A reflected ANSI contrast measurement can be representative of the actual audience viewing experience. By comparison, a measurement of incident ANSI contrast, using a properly baffled optical detector head, will quantify the actual contrast capabilities of the projection system.

As with frame sequential contrast, wherein the traditional motion picture film projection system provides a high contrast target (5,000–10,000:1) for the electronic projection systems to attempt to match, the film system similarly provides a challenging in-frame contrast target (300–400:1). In actuality, the traditional film projection system could be upgraded for better ANSI contrast performance, principally by better design of the illumination system, if the industry had perceived a strong need. The degree to which a projection system suffers degradation of in-frame contrast depends on various factors that are generally secondary to the basic imaging properties of the system. In some cases, light scatter, whether from internal glass inhomogeneities, glass surface scatter, and glass edge or barrel housing edge scatter, can be a significant contributor. Residual reflections from coated surfaces can also cause in-frame contrast loss, as well as ghost images. In-frame contrast can be improved by a variety of techniques, including reducing the number of components, improving surface quality, blackening surfaces, adding baffles within and outside lens assemblies, providing improved anti-reflection coatings, tilting optical elements to re-direct reflections out of the system, and providing better control of illumination light. Typically, the problem in improving ANSI in-frame contrast is to determine which phenomena are the sources of the problems, and what, if anything, can be done to improve the situation. In many cases, neither the solutions nor the source of the problems are obvious.

It can be more difficult to enhance ANSI contrast in an electronic projection system based on polarization optics and LCDs, compared to DMD based systems, as the former systems are typically complicated with additional optical elements. In the case of the digital cinema projector disclosed in related applications that share a common assignee with the present application, listed in the parent application, U.S. Ser. No. 10/392,685, the projector originally provided a modest 120:1 ANSI contrast. Diagnosis of the problem was accomplished by a combination of experimentation and modeling, the latter performed with Trace-Pro illumination design software (Lambda Research Corporation, Littleton, Mass.). A test, involving a camera positioned at the screen to look back into the projection lens showed a relatively uniform light distribution, which was indicative that ghost reflections were not a dominant source. System modeling showed that lens edge and lens barrel reflections, as well as lens surface scatter, were not significant contributors. Scatter measurements of a wire grid type polarization analyzer 72 showed that the patterned wire grid coating was not causing significant scatter that could affect ANSI contrast. Modeling further revealed that neither blackening of selected internal surfaces nor the addition of internal baffles would provide little improvement.

Rather, system modeling indicated that ANSI in-frame contrast degradation in the digital cinema projector was primarily impacted by on-state light back reflecting off of various optical components returning to the LCD, where they are incident onto off-state regions of the modulator. A portion of this back reflected light is then reflected off both the LCD and the wire grid polarization beamsplitter and returned into the imaging system, to ultimately reduce the observed contrast seen in the dark regions of the on-screen image. Although back reflections off of the lens elements that comprise the magnifying relay lenses 28 contribute to ANSI contrast loss, the dominant back reflection sources were found to be the polarization analyzers 72, the waveplates 64r, 64g, 64b, and the v-prism dichroic combiner 26 (see FIG. 12).

In general, given this knowledge, the ANSI contrast performance of this system can be improved by providing better anti-reflection components to these various elements. In particular, the waveplates 64r, 64g, 64b and the V-prism dichroic combiner 26 can be coated with better coatings (~0.15% residual Fresnel reflectivity instead of ~0.25–0.35% reflectivities). As the waveplates 64r, 64g, 64b already have color specific retardances, adding the appropriate color optimized anti-reflection coatings to these elements is easy. Likewise, the red, green, and blue input faces of the V-prism dichroic combiner 26 can readily be coated with the appropriate color optimized anti-reflection coating as well. The lens elements of the magnifying relays 28 can be similarly coated with color specific coatings appropriate to the given color channel. While providing color specific coatings generates extra work relative to logistics and tracking, the color specific coatings have fewer layers than the alternate broadband visible spectrum coating, and are therefore easier to deposit. Alternately, reflections can be reduced by minimizing the number of optical surfaces having exposure to air. For example, if the waveplates 64r, 64g, 64b are optically mounted or bonded (for example, by means of an index matching optical adhesive) to the v-prism dichroic combiner 26, then an air to glass transition is eliminated and one less anti-reflection coating is required.

As another approach to minimizing the impact of scatter, high Fresnel reflections, and ghosts on ANSI in-frame, optical surfaces can be deliberately tilted so that stray light is directed put of the system. For example, waveplates 64r, 64g, 64b, shown in FIG. 6, can be tilted at an angle (typically <15°) relative to the optical axis, such that the residual reflections are removed from the optical path. This reflected light can be directed into one or more beam dumps, which trap the light so that minimal light is returned to the optical system.

In this particular instance, with respect to the digital cinema projection system 10 of the present invention, reflections off the polarization analyzer 72 were found to significantly contribute to ANSI contrast loss in the system. In particular, when polarization analyzer 72 is a wire grid polarizer device, a relatively large (~5%) portion of the on-state light is reflected back towards the LCD 30, where it can be incident onto off-state regions of the display panel, and thereby result in ANSI contrast degradation. This problem could be reduced if the polarization analyzer 72 comprised a device that inherently reduced reflections. For example, polarization analyzer 72 could be a dye sheet polarizer (i.e., a Polaroid polarizer) which generally absorb, rather than reflect, the light that is not transmitted. However, the power levels present in a digital cinema projector are sufficiently high that a dye sheet polarizer would likely fail, by fading, if not outright combustion. An alternate absorbing polarizer has been developed by Polatechno of Niigata, Japan, in which an absorbing polarizer is fabricated on a thermally conductive optically transparent sapphire substrate. However, this technology has not been broadly commercialized and is not readily available. As another alternative, an improved wire grid polarizer that provides reduced reflections could be developed and used for polarization analyzer 72. However, while the potential performance of wire grid polarizers can be improved in various ways, including by optimizing wire pitch and profile (see U.S. Pat. No. 6,243,199 by Hansen et al.), or with multi-layer dielectric structures (see U.S. Pat. No. 6,122,103 by Perkins et al.), or with multi-layer metallic structures (see U.S. Pat. No. 6,532,111 by Kurtz et al.), in general it is easier to optimize transmitted contrast and transmitted light efficiency than it is to reduce reflected light efficiency. While wire grid polarizers are quite robust, devices with significantly reduced reflected light efficiency are not presently available.

In the projection apparatus 10 of FIG. 12, the polarization analyzer 72 is shown under its nominal operational condition, mounted between a wire grid polarization beamsplitter 24 and a magnifying relay lens 28, with an orthogonal orientation to the optical axis of the associated magnifying relay 28. Conceptually, polarization analyzer 72 could remain in its present location, but be tilted by some nominally fixed angle so that the reflections are directed out of the imaging optical path. However, although the conceptual system illustrated in FIG. 12 does not show this, the working distance available between the polarization beamsplitter and the magnifying relay lens is very constrained, which makes it difficult to fit in the space required for a tilted plate polarizer. Moreover, if a wire grid polarization analyzer 72 was tilted at a small angle, it would be difficult to find the space for the rejected reflected light to exit the system without encountering imaging optical elements. Alternately, a wire grid polarization analyzer 72 could be tilted at a large angle, such as 45°, which would insure that the rejected reflected light would exit the imaging optical path. However, in that case, the working distance requirements are large, and the well-known aberrations of imaging light transmission through a tilted plane parallel plate are incurred. While a polarization beamsplitter, such as MacNeille type prism, could be used in place of a 45° parallel plate polarizer without suffering the tilted plate aberrations, significant additional working distance would still be required.

Figure 14:
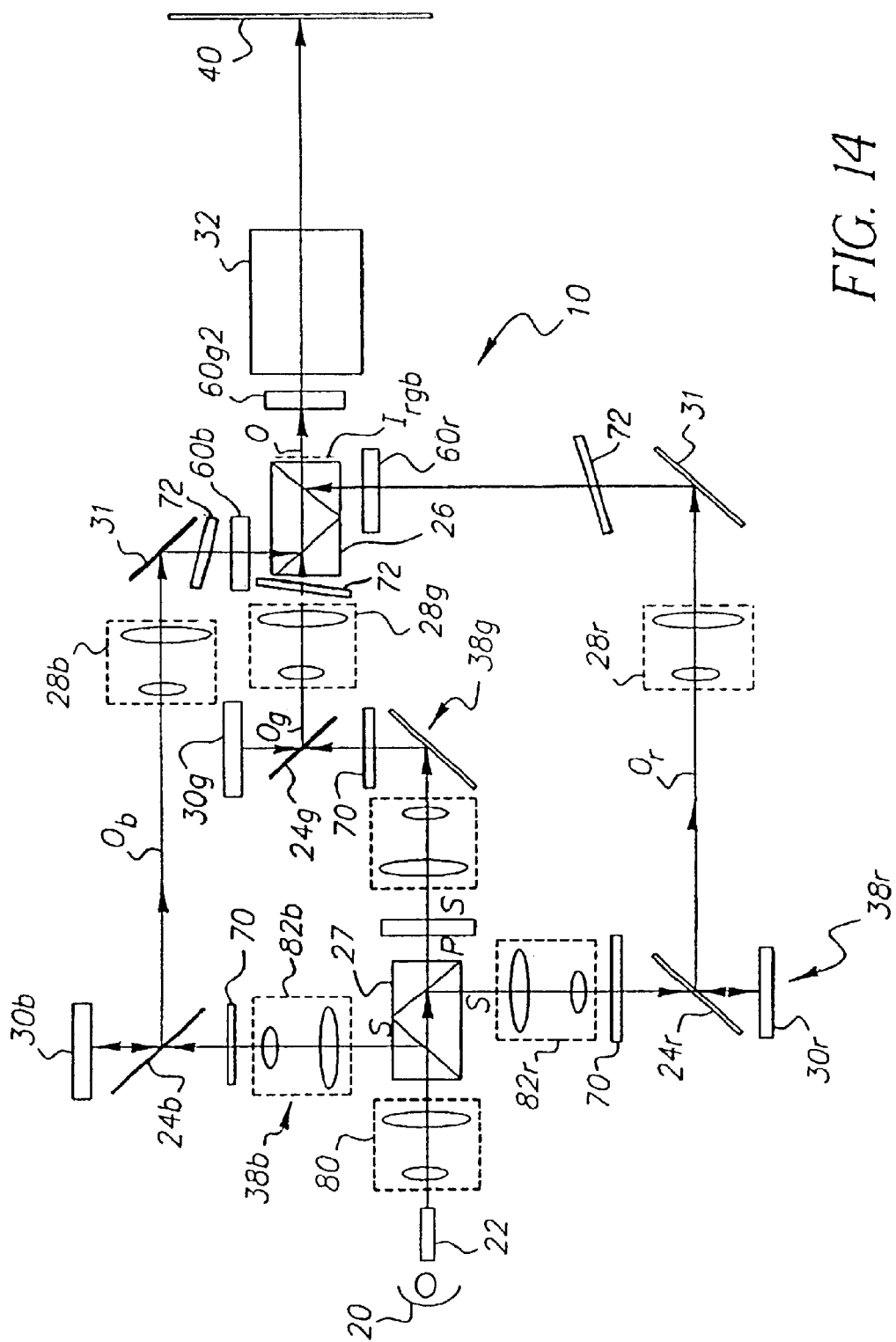
FIG. 14 is a schematic view showing key components of a projection apparatus in yet another alternative embodiment of the present invention, wherein the polarization analyzer has been re-positioned to improve ANSI in-frame contrast.

Rather, in the case of the projection apparatus 10 of the present invention, the best solution is to re-locate the wire grid polarization analyzer 72 after the main body of the magnifying relay lens 28. For example, with respect to the system shown in FIG. 12, the polarization analyzer 72 in the blue channel would be re-positioned to be after the blue magnifying relay lens 28b and either before or after the turning mirror 31. As shown in FIG. 14, the wire grid polarization analyzer 72 would then be tilted at an appropriate angle relative to a local optical axis to direct the rejected reflected light out of the optical system, such that it cannot be scattered or reflected back into the optical path to any significant degree. In general, in each color channel, the wire grid polarization analyzer 72 is preferably located in the telecentric image space provided by the corresponding magnifying relay lens 28. In actuality, the magnifying relay lenses 28 each have a field lens (not shown) which makes the convergent light cones telecentric to the intermediate image plane $I_{rgb}$. The tilted wire grid polarization analyzer 72 can be located in other than telecentric space, and could for example be located prior to the aforementioned field lens. Most importantly, in the case of the projection system of the present invention, several advantages are gained by locating the tilted wire grid polarization analyzer 72 in the telecentric (or nearly so) magnified image space created by the magnifying relay lenses 28. In particular, the magnifying relay lenses 28 were previously described as operating at a magnification Rx>1x, where preferably Rx=2x. In that case the F/2.3 light collected at the spatial light modulators 30 becomes F/4.6 light into the intermediate image plane $I_{rgb}$. As a result, the working distance for locating the tilted wire grid polarization analyzer 72 is much greater than was available in the object (modulator) space. Additionally, the aberrations incurred by transmitting an F/4.6 imaging optical beam through the tilted plane plate polarizer are much reduced relative to F/2.3 object space (coma is proportional the numerical aperture squared). Finally, the tilted wire grid polarization analyzer 72 is preferentially located in the telecentric optical space provided after the field lens of the magnifying relay lenses 28, as the reflected light losses and aberrations incurred by transmission through the tilted plate will be nominally identical for all field points.

Certainly, the advantages of locating a tilted wire grid polarization analyzer 72 in the magnified object space provided by the magnifying relay lenses 28 are significant and generally predictable by modeling and analysis, including an anticipated improvement in ANSI in-frame contrast. However, re-locating the wire grid polarization analyzer 72 in this manner could have a less predictable detrimental impact on frame sequential contrast. In particular, the intervening optical elements between the wire grid polarization beamsplitter 24 and the re-located wire grid polarization analyzer 72 may have unintended mechanical or thermally induces stress birefringence, which could cause the frame sequential contrast to be reduced. As an example, the lens elements which comprise the magnifying relay lenses 28 could be mounted or fabricated with an unintended mechanical stress birefringence that could cause polarization rotation, and thereby a loss in contrast when the image light subsequently encounters the re-located and tilted wire grid polarization analyzer 72. However, testing has shown that a wire grid polarization analyzer 72 can be tilted and re-located (after turning mirror 31) as shown in FIG. 14 so as to improve ANSI in-frame contrast without significantly degrading frame sequential contrast. For example, in one instance a tilted wire grid polarization analyzer 72 was used in combination with magnifying relay lenses 28 having color specific AR coatings, with the result that ANSI contrast improved from ~130:1 to ~350:1, while frame sequential contrast was measured as ~2500:1. The tilt angle applied is a trade off of the aberrations induced and the space required versus how completely and easily the residual reflected light clears the imaging optical path, but an angle between 5° and 25° will be generally practical. The same approach could also be applied to a projection system with transmissive spatial light modulators (see FIG. 11), by moving the polarization analyzers 72 in the optical path to be after the magnifying relays 28 of that system.

Thus, what is provided is an improved projection apparatus and method for digital image projection with an illumination system for providing, from a white light source, color illumination having high intensity, high efficiency, and sharply defined spectral edges and a modulation path optics having magnifying relay lenses for providing a suitable image for projection onto a display surface.

Parts List

10 Projection apparatus
20 Light source
20r Light source, red
20g Light source, green
20b Light source, blue
22 Uniformizing optics
22r Uniformizing optics, red
22g Uniformizing optics, green
22b Uniformizing optics, blue
24 Polarizing beamsplitter
24r Polarizing beamsplitter, red
24g Polarizing beamsplitter, green
24b Polarizing beamsplitter, blue
426 Dichroic combiner
27 Dichroic separator
28 Magnifying relay lens
28r Magnifying relay lens, red
28g Magnifying relay lens, green
28b Magnifying relay lens, blue
30 Spatial light modulator
31 Turning mirror
30r Spatial light modulator, red
30g Spatial light modulator, green
30b Spatial light modulator, blue
32 Projection lens
36 Dichroic surface
38 Light modulation assembly
38r Light modulation assembly, red
38g Light modulation assembly, green
38b Light modulation assembly, blue
40 Display surface
42 Prism
44a Surface
44b Surface
50 Philips prism
60r Color-selective polarization filter, red
60g Color-selective polarization filter, green
60b Color-selective polarization filter, blue
60g2 Color-selective polarization filter, green
62r Color filter, red
62g Color filter, green
62b Color filter, blue
64r Halfwave plate, red
64g Halfwave plate, green
64b Halfwave plate, blue
70 Prepolarizer
72 Analyzer
80 Base condenser relay
80/1 Lens
80/2 Lens
80/3 Lens
80m1 Mirror
80m2 Mirror
82 Reducing relay
82r Reducing relay, red
82g Reducing relay, green
82b Reducing relay, blue
82a Aperture
86 Letterboxing aperture
82/1 Lens
82/2 Lens
82m Mirror
126 X-cube
126' X-cube
128a Prism
128b Prism
128c Prism
128d Prism
130a Surface
130b Surface
132 Lens
150a Curve
150z Curve

What is claimed is:

1. A projection apparatus for projecting a multicolor image, the apparatus comprising:

(a) a light source for providing visible light;
(b) a dichroic separator for splitting the visible light into color light beams;
(c) illumination optics to direct each of said color light beams into a corresponding light modulation assemblies;
(d) wherein each of said light modulation assemblies are similarly constructed and comprise:
　(i) a pre-polarizer for pre-polarizing a color light beam;
　(ii) a polarization beamsplitter for transmitting a color light beam having a first polarization and reflecting light having a second polarization, thereby providing a polarized beam of light;
　(iii) a reflective spatial light modulator which receives said polarized beam of light having either a first polarization or a second polarization, and which selectively modulates said polarized beam of light to encode data thereon, providing both modulated light and unmodulated light which differ in polarization;
　wherein said reflective spatial light modulator reflects back both said modulated light and said unmodulated light to said polarization beamsplitter; and (iv) a polarization analyzer which receives said modulated light, and which further removes any residual unmodulated light from said modulated light;

(v) a magnifying relay lens for focusing and relaying said modulated light to form a magnified real image of said reflective spatial light modulator;

(e) a dichroic combiner which forms a multicolor image by overlapping said magnified real images from each of said color light beams onto a common optical axis;

(f) a projection lens for projecting said multicolor image toward a display surface; and (g) wherein each of said polarization analyzers are tilted relative to a local optical axis and are located in proximity to at least one of said magnified real images of the color light beams.

2. A projection apparatus according to claim 1 wherein said polarization beamsplitter is a wire grid polarizer.

3. A projection apparatus according to claim 1 wherein said polarization analyzer is a wire grid polarizer.

4. A projection apparatus according to claim 3 wherein said wire grid polarization analyzer is tilted at a fixed angle between 5 to 25 degrees relative to a local optical axis.

5. A projection apparatus according to claim 4 wherein tilting of said wire grid polarization contributes to a high in-frame contrast.

6. A projection apparatus according to claim 3 wherein said wire grid polarization analyzer is located in a telecentric optical space in general proximity to the image created by said magnifying relay lens.

7. A projection apparatus according to claim 1 wherein said magnifying relay lenses comprise lens elements that are coated with color optimized anti-reflection coatings.

8. A projection apparatus according to claim 1 wherein said magnifying relay lenses operate at a magnification of 2×.

9. A projection apparatus according to claim 1 wherein said dichroic combiner is either a v-prism or a x-prism.

10. A projection apparatus according to claim 9 wherein input faces of said dichroic combiner are coated with color optimized anti-reflection coatings for each of said color light beams.

11. A projection apparatus according to claim 1 that further comprises waveplates which are optically mounted to input faces of said dichroic combiner.

12. A projection apparatus according to claim 1 wherein each of said reflective spatial light modulators is a liquid crystal device.

13. A projection apparatus for projecting an image comprising:

(a) a light source for providing visible light;

(b) illumination optics to direct a light beam into a light modulation assembly;

(c) wherein said light modulation assembly comprises:
 (i) a pre-polarizer for pre-polarizing a light beam;
 (ii) a polarization beamsplitter for transmitting a light beam having a first polarization and reflecting light having a second polarization;
 (iii) a reflective spatial light modulator which receives a polarized beam of light having either a first polarization or a second polarization, and which selectively modulates said polarized beam of light to encode data thereon, providing both modulated light and unmodulated light which differ in polarization;

wherein said reflective spatial light modulator reflects back both said modulated light and said unmodulated light to said wire grid polarization beamsplitter; and (iv) a polarization analyzer which receives said modulated light, and which further removes any residual unmodulated light from said modulated light; and (d) a magnifying relay lens that focuses and relays said modulated light to form a magnified real image of said reflective spatial light modulator;

(e) a projection lens for projecting said magnified real image onto a display surface; and (f) wherein said polarization analyzer is tilted relative to a local optical axis and is located in proximity to said magnified real image.

14. A projection apparatus for projecting a multicolor image comprising:

(a) a light source for providing visible light;

(b) a dichroic separator for splitting said visible light into first, second, and third color light beams;

(c) illumination optics to direct each of said color light beams into corresponding first, second, and third light modulation assemblies;

(d) wherein each of said light modulation assemblies are similarly constructed and comprise:
 (i) a pre-polarizer for pre-polarizing a color light beam;
 (ii) a polarization beamsplitter for transmitting a color light beam having a first polarization and reflecting light having a second polarization, thereby providing a polarized beam of light;
 (iii) a reflective spatial light modulator which receives said polarized beam of light and selectively modulates said polarized beam of light to encode data thereon, providing both modulated light and unmodulated light which differ in polarization;
 (iv) a magnifying relay lens for focusing and relaying said modulated light to form a magnified real image of said reflective spatial light modulator; and
 (v) a polarization analyzer which receives said modulated and unmodulated light, and which removes any residual unmodulated light from said modulated light;

(e) a dichroic combiner which forms a multicolor image by overlapping said magnified real images from each of said color light beams onto a common optical axis;

(f) a projection lens for projecting said multicolor image toward a display surface; and (g) wherein each of said polarization analyzers are tilted relative to a local optical axis and are located in proximity to at least one of said magnified real images of the color light beams.

15. A projection apparatus for projecting a multicolor image comprising:

(a) a light source for providing visible light;

(b) a dichroic separator for splitting said visible light into first, second, and third color light beams;

(c) illumination optics to direct each of said color light beams into corresponding first, second, and third light modulation assemblies;

(d) wherein each of said light modulation assemblies are similarly constructed and comprise:
 (i) a pre-polarizer for pre-polarizing one of said color light beams thereby providing a polarized beam of light;

(ii) a transmissive spatial light modulator which receives said polarized beam of light and selectively modulates said polarized beam of light to encode data thereon, providing both modulated light and unmodulated light which differs in polarization;

(iii) a magnifying relay lens for focusing and relaying said modulated light to form a magnified real image of said reflective spatial light modulator; and (iv) a polarization analyzer which receives said modulated and unmodulated light, and which removes unmodulated light from said modulated light;

(e) a dichroic combiner which forms a multicolor image by overlapping said magnified real images from each of said color light beams onto a common optical axis;

(f) a projection lens for projecting said multicolor image toward a display surface; and (g) wherein each of said polarization analyzers are tilted relative to a local optical axis and are located in proximity to at least one of said magnified real images of the color light beams.

* * * * *